US011924015B2

(12) United States Patent
Khoshnevisan et al.

(10) Patent No.: US 11,924,015 B2
(45) Date of Patent: Mar. 5, 2024

(54) PHASE TRACKING REFERENCE SIGNAL FOR MULTI-TRANSMIT/RECEIVE POINTS

(71) Applicant: QUALCOMM Incorporated, San Diego, CA (US)

(72) Inventors: Mostafa Khoshnevisan, San Diego, CA (US); Xiaoxia Zhang, San Diego, CA (US); Peter Gaal, San Diego, CA (US); Tao Luo, San Diego, CA (US); Jing Sun, San Diego, CA (US); Tae Min Kim, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/062,235

(22) Filed: Oct. 2, 2020

(65) Prior Publication Data

US 2021/0105166 A1 Apr. 8, 2021

Related U.S. Application Data

(60) Provisional application No. 62/911,086, filed on Oct. 4, 2019.

(51) Int. Cl.
*H04L 27/26* (2006.01)
*H04L 5/00* (2006.01)
(Continued)

(52) U.S. Cl.
CPC ........ *H04L 27/2675* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS 10,560,243 B2 2/2020 Bai et al.
10,608,799 B2 * 3/2020 Nam ..................... H04W 72/12
(Continued)

FOREIGN PATENT DOCUMENTS

CN 104956611 A 9/2015
CN 108282877 A 7/2018
(Continued)

OTHER PUBLICATIONS

Huawei, et al., "Enhancements on Multi-TRP/Panel Transmission", 3GPP Draft, 3GPP TSG RAN WG1 #97, R1-1906029, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051727486, 17 pages, Retrieved from the Internet: URL:http://www.3gpp.org/ftp/Meetings%5F3GPP%5FSYNC/RAN1/Docs/R1%2D1906029%2Ezip [retrieved on May 13, 2019], the whole document, A Paragraph[0003]-Paragraph[0004].
(Continued)

*Primary Examiner* — Otis L Thompson, Jr.
(74) *Attorney, Agent, or Firm* — ArentFox Schiff LLP

(57) ABSTRACT

A phase tracking reference signal (PT-RS) may be transmitted to enable a receiver to correct phase noise in wireless communication. A UE scheduled for one PDSCH with DMRS ports in two or more DMRS CDM groups that are associated with two TCI states may be configured for PT-RS using two PT-RS ports. Therefore, rather than limiting PT-RS to a single port, the PT-RS may be transmitted to the UE using two PT-RS ports. The apparatus transmits a capability indication for more than one PT-RS port for
(Continued)

receiving a downlink shared channel based on a first TCI and a second TCI. The apparatus receives a configuration for a maximum number of downlink PT-RS ports from a base station.

26 Claims, 28 Drawing Sheets

(51) Int. Cl.
    *H04L 5/10*     (2006.01)
    *H04W 8/24*     (2009.01)
    *H04W 72/23*     (2023.01)
    *H04W 72/53*     (2023.01)

(52) U.S. Cl.
    CPC ............ *H04L 5/10* (2013.01); *H04L 27/2613* (2013.01); *H04W 8/24* (2013.01); *H04W 72/23* (2023.01); *H04W 72/53* (2023.01)

(56) References Cited

U.S. PATENT DOCUMENTS

| | | | |
|---|---|---|---|
| 2018/0367277 A1 | 12/2018 | Zhang et al. | |
| 2018/0368277 A1 | 12/2018 | Bachar et al. | |
| 2019/0166615 A1* | 5/2019 | Nimbalker | H04W 72/14 |
| 2019/0215118 A1 | 7/2019 | Moles Cases et al. | |
| 2019/0239212 A1* | 8/2019 | Wang | H04L 5/0091 |
| 2019/0296876 A1* | 9/2019 | Zhang | H04L 5/0023 |
| 2020/0008102 A1 | 1/2020 | Yokomakura et al. | |
| 2020/0015200 A1* | 1/2020 | Vilaipornsawai | H04L 25/0204 |
| 2020/0162303 A1 | 5/2020 | Kim et al. | |
| 2020/0229098 A1* | 7/2020 | Cheng | H04W 72/042 |
| 2020/0412503 A1* | 12/2020 | Huang | H04L 5/0051 |
| 2021/0014021 A1* | 1/2021 | Hunukumbure | H04L 5/0051 |
| 2021/0105120 A1 | 4/2021 | Khoshnevisan et al. | |
| 2021/0136739 A1* | 5/2021 | Chen | H04L 5/0051 |
| 2022/0095350 A1* | 3/2022 | Lee | H04W 72/12 |
| 2022/0166570 A1* | 5/2022 | Hu | H04J 13/0003 |
| 2022/0295589 A1* | 9/2022 | Tsai | H04B 17/309 |
| 2022/0302981 A1* | 9/2022 | Liu | H04B 7/0478 |
| 2022/0322399 A1 | 10/2022 | Kim et al. | |
| 2022/0337300 A1* | 10/2022 | Yuk | H04L 5/0092 |

FOREIGN PATENT DOCUMENTS

| | | |
|---|---|---|
| EP | 3547782 A1 | 10/2019 |
| WO | 2018132237 | 7/2018 |
| WO | 2021066624 A1 | 4/2021 |

OTHER PUBLICATIONS

International Search Report and Written Opinion—PCT/US2020/054173—ISA/EPO—dated Jan. 15, 2021.
Vivo: "Remaining Issues on Multi-TRP/Panel Transmission", 3GPP Draft, R1-1912039, 3GPP TSG RAN WG1 #99, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823170, 11 Pages, Retrieved from the Internet: URL:https://ftp.3gpp.org/tsg_ran/WG_RL1/TSGR1_99/Docs/R1-1912039.zip,R1-1912039_Remaining Issues on multi-TRP Panel Transmission_final.docx [retrieved on Nov. 9, 2019] Paragraph [03.4].

\* cited by examiner

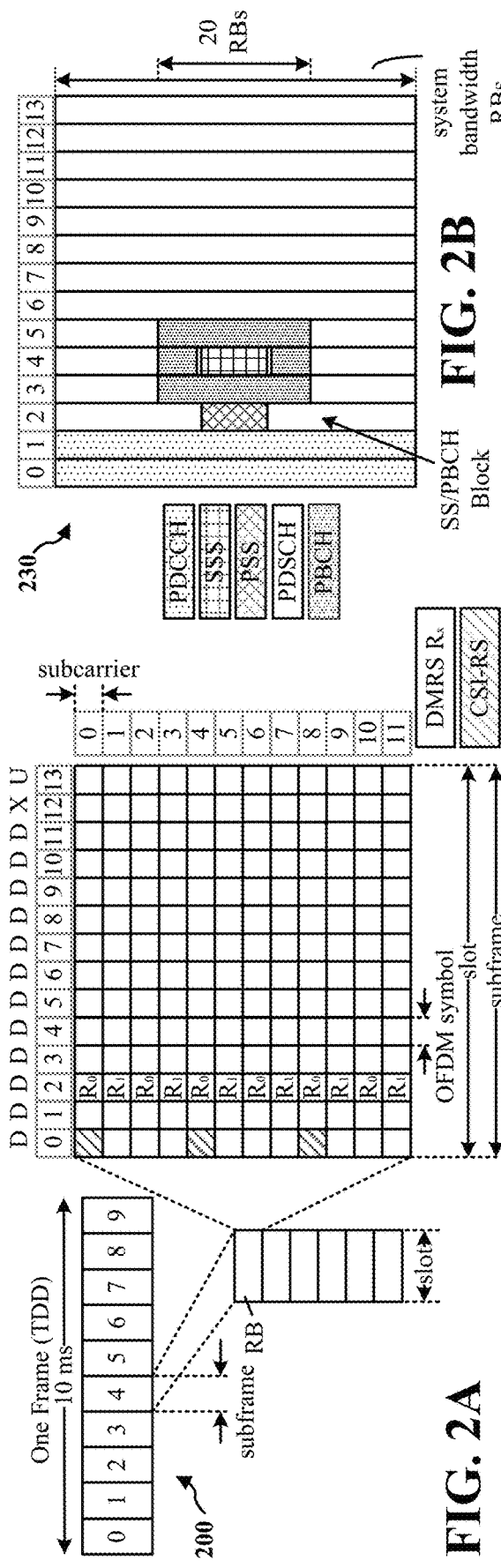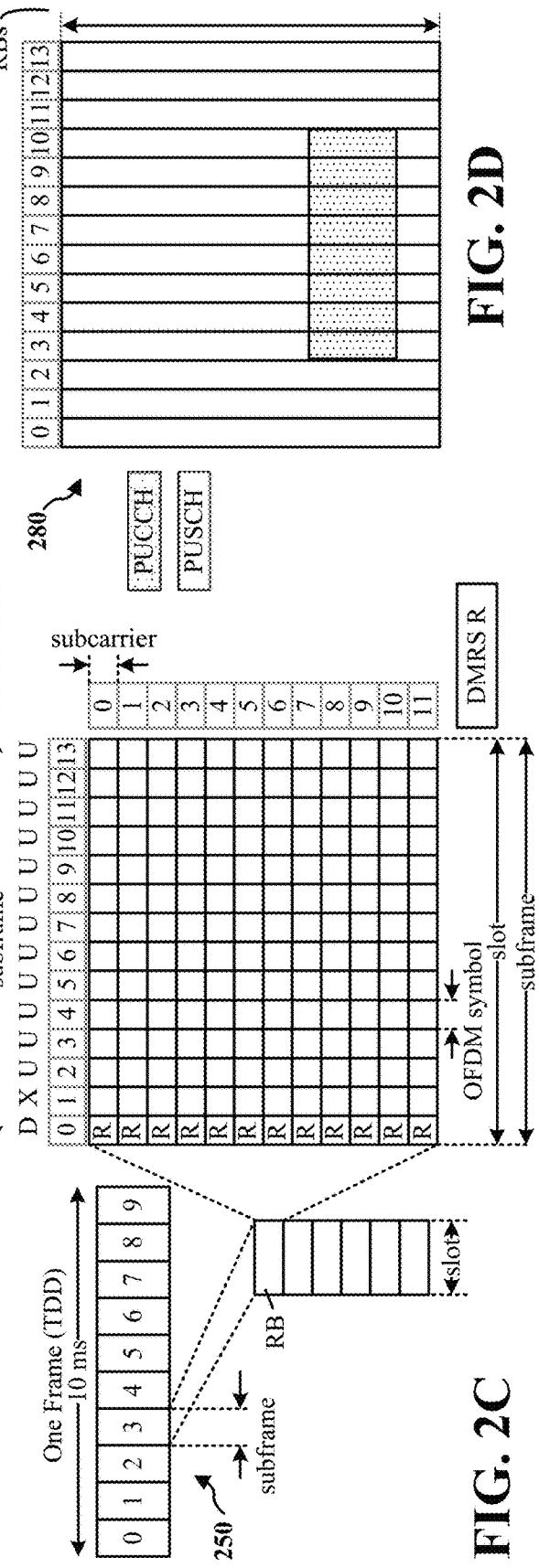

PHASE TRACKING REFERENCE SIGNAL FOR MULTI-TRANSMIT/RECEIVE POINTS

CROSS REFERENCE TO RELATED APPLICATION(S)

This application claims the benefit of U.S. Provisional Application Ser. No. 62/911,086, entitled "PHASE TRACKING REFERENCE SIGNAL FOR MULTI-TRANSMIT/RECEIVE POINTS" and filed on Oct. 4, 2019, which is expressly incorporated by reference herein in its entirety.

BACKGROUND

Technical Field

The present disclosure relates generally to communication systems, and more particularly, to phase tracking reference signal (PT-RS) procedures for multi-transmit/receive points (TRPs) in wireless communication networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A phase tracking reference signal (PT-RS) may be transmitted to enable a receiver to correct phase noise in wireless communication. A PT-RS may be limited to transmission from a single downlink PT-RS port. The PT-RS may be transmitted within allocated resource blocks (RBs) of a PDSCH and may be used for phase noise correction. A base station may configure a user equipment (UE) for the presence of the PT-RS, as well as parameters associated with the PT-RS. In some examples, a single downlink control information (DCI) from a base station may schedule downlink transmissions (such as PDSCH) from multiple transmit receive points (TRPs). Different TRPs may transmit the PDSCH using different spatial layers in overlapping RBs and symbols. Therefore, the PDSCH for the two transmission configuration indication (TCI) states may be transmitted using the same time and frequency resources and different spatial layers. Different TRPs may transmit the PDSCH using different RBs using frequency division multiplexing (FDM), such that the PDSCH for the first TCI state may be transmitted using a first set of frequency resources and the PDSCH for the second TCI may be transmitted using a second set of frequency resources. A UE that is scheduled for one PDSCH with DMRS ports in two or more DMRS CDM groups that are associated with two TCI states may be configured for PT-RS using two PT-RS ports. Aspects provided herein allow for PT-RS to be transmitted to the UE using two PT-RS ports.

In an aspect of the disclosure, a method, a computer-readable medium, and an apparatus are provided for indicating the capability for supporting more than one PT-RS port. The apparatus transmits a capability indication for more than one PT-RS port for receiving a downlink shared channel based on a first TCI state and a second TCI state. The apparatus receives a configuration for a maximum number of downlink PT-RS ports from a base station.

In another aspect of the disclosure, a method, a computer-readable medium, and an apparatus are provided for configuring a maximum number of downlink PT-RS ports. The apparatus receives a capability indication from a UE for more than one PT-RS port for receiving a downlink shared channel based on a first TCI state and a second TCI state. The apparatus configures the UE for a maximum number of downlink PT-RS ports.

In another aspect of the disclosure, a method, a computer-readable medium, and an apparatus are provided for determining a PT-RS density in a frequency domain. The apparatus receives a configuration for a precoding resource block group (PRG) of two resource blocks (RBs). The apparatus receives DCI indicating two TCI states. The apparatus determines frequency division multiplexing (FDM) is to be used for a PT-RS. The apparatus determines a PT-RS density in a frequency domain based on the PRG of two RBs, the two TCI states, and determining that FDM is to be used for the PT-RS.

In another aspect of the disclosure, a method, a computer-readable medium, and an apparatus are provided for configuring a PT-RS for a UE. The apparatus configures a UE for a PRG of two RBs. The apparatus transmits DCI to the UE indicating two TCI states. The apparatus transmits a PT-RS using FDM and using a PT-RS density in a frequency domain that is based on the PRG of two RBs, the two TCI states, and the use of FDM for the PT-RS.

In another aspect of the disclosure, a method, a computer-readable medium, and an apparatus are provided to account for a PT-RS of a second downlink shared channel during the reception of a first downlink shared channel. The apparatus receives first DCI allocating first resources for a first downlink shared channel for a first TCI state. The apparatus receives second DCI allocating second resources for a second downlink shared channel for a second TCI state. The apparatus determines that the first resources overlap with the second resources. The apparatus receives the first downlink shared channel based on rate matching of resource elements for the first downlink shared channel around a PT-RS of the second downlink shared channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

DETAILED DESCRIPTION

Figure 1:
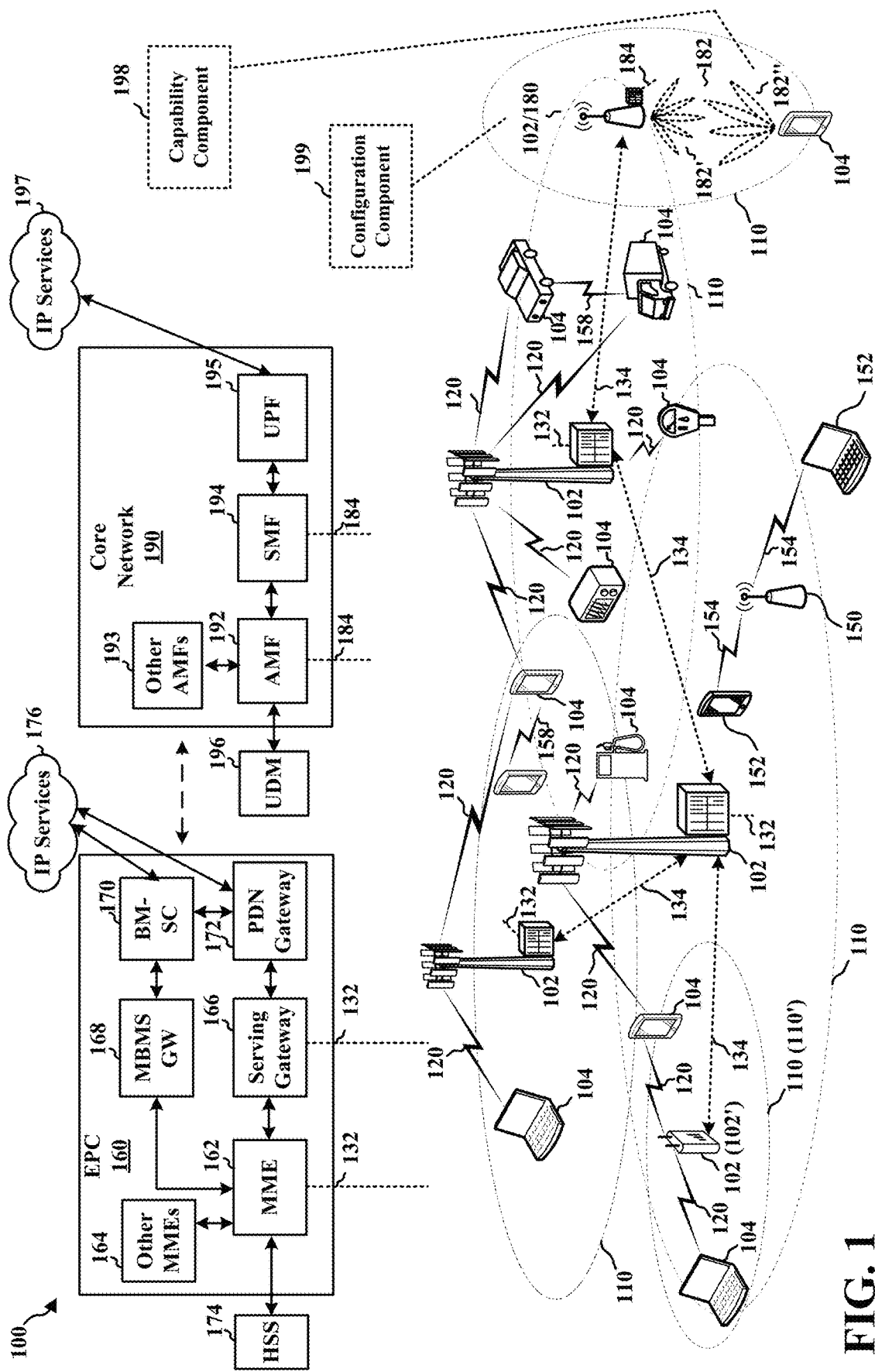
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to provide an indication of the ability to support more than one PT-RS port for receiving a downlink shared channel. For example, the UE 104 of FIG. 1 may include a capability component 198 configured to transmit a capability indication for more than one PT-RS port for receiving a downlink shared channel based on a first TCI state and a second TCI state. The UE 104 may receive a configuration for a maximum number of downlink PT-RS ports from a base station.

Referring again to FIG. 1, in certain aspects, the base station 102/180 may be configured to configure the UE for a maximum number of downlink PT-RS ports. For example, the base station 102/180 of FIG. 1 may include a configuration component 199 configured to configure the UE for a maximum number of downlink PT-RS ports. The base station 102/180 may receive a capability indication from a UE for more than one PT-RS port for receiving a downlink shared channel based on a first TCI state and a second TCI state.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
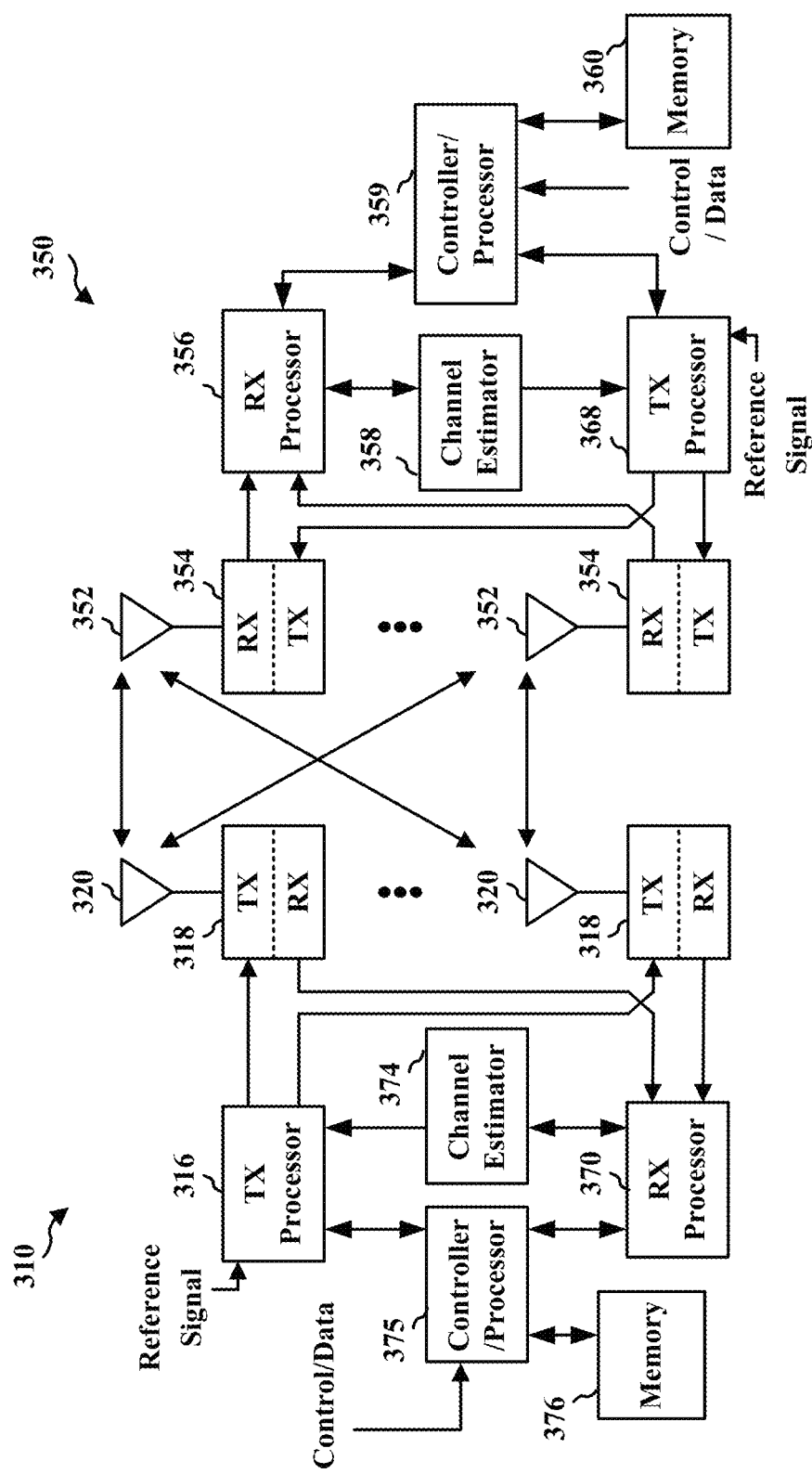
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

A phase tracking reference signal (PT-RS) may be transmitted to enable a receiver to correct phase noise in wireless communication. The PT-RS may enable a phase to be tracked at a receiver. The phase noise of a transmitter or receiver may increase as the frequency of the communication increases. The PT-RS may help enable suppression of phase noise and common phase error, such as for mmW communication or frequency range 2 (FR2) communication. A PT-RS may be limited to transmission from a single downlink PT-RS port. The PT-RS may be transmitted within allocated resource blocks (RBs) of a PDSCH and may be used for phase noise correction. The PT-RS may be transmitted so that it does not collide with certain signals. For example, the PT-RS may be transmitted so that it does not overlap with time and frequency resources for a demodulation reference signal (DMRS), a non-zero power CSI reference signal (NZP-CSI-RS), or a synchronization signal block (SSB). A base station may configure a UE for the presence of the PT-RS, as well as parameters associated with the PT-RS. The base station may configure the UE for the PT-RS using RRC messages. The PT-RS port may be associated with a DMRS port of a PDSCH. For example, the PT-RS port may be associated with a lowest indexed DMRS port assigned for a PDSCH. The DMRS port(s) may have a quasi co-location (QCL) relationship with the PT-RS port, such as a QCL relationship based on QCL Type A or QCL Type D. A base station may transmit a PT-RS using a density in time of every L OFDM symbols, L being an integer number of symbols. L may depend on a modulation and coding scheme (MCS) for the communication and may also be based on configurable thresholds. For example, Table 1 illustrates example values of L based on various MCS for the communication. In the table, $1_{MCS}$ mcs is an MCS index. In the table, ptrs-MCS$_1$, ptrs-MCS$_2$, ptrs-MCS$_3$, ptrs-MCS$_4$ may be configurable thresholds.

TABLE 1

Time Density of PT-RS as a function of scheduled MCS

| Scheduled MCS | Time Density ($L_{PT-RS}$) |
|---|---|
| $1_{MCS}$ < ptrs-MCS$_1$ | PT-RS is not present |
| ptrs-MCS$_1$ ≤ $1_{MCS}$ < ptrs-MCS$_2$ | 4 |
| ptrs-MCS$_2$ ≤ $1_{MCS}$ < ptrs-MCS$_{23}$ | 2 |
| ptrs-MCS$_3$ ≤ $1_{MCS}$ < ptrs-MCS$_4$ | 1 |

A base station may transmit a PT-RS using a density in frequency of every K RBs, K being an integer number of RBs. K may depend on a number of scheduled RBs for the communication and may also be based on configurable thresholds. For example, Table 2 illustrates example values of K based on various numbers of scheduled RBs ($N_{RB}$). $N_{RB0}$ and $N_{RB1}$ may be configurable thresholds.

TABLE 2

Frequency Density of PT-RS as a function of scheduled bandwidth

| Scheduled bandwidth | Frequency Density ($K_{PT-RS}$) |
|---|---|
| $N_{RB}$ < $N_{RB0}$ | PT-RS is not present |
| $N_{RB0}$ ≤ $N_{RB}$ < $N_{RB1}$ | 2 |
| $N_{RB1}$ ≤ $N_{RB}$ | 4 |

In the frequency domain, in every K RBs, one resource element (RE) is used to transmit PT-RS. The base station may avoid transmitting or may not transmit DMRS, NZP CSI-RS, CSI-RS, SSB, reserved resources for RM, and detected PDCCH in the resource elements for PT-RS. The REs for the PT-RS may be indexed within the allocated RBs from 0, 1, . . . , $N_{sc}^{RB}$. $N_{sc}^{RB}$ corresponds to a number of subcarriers per resource block, e.g., 12 subcarriers. For example, for the purpose of PT-RS mapping, the resource blocks allocated for PDSCH transmission may be numbered from 0 to $N_{RB}$−1 from the lowest scheduled resource block to the highest. The corresponding subcarriers in this set of resource blocks may be numbered in increasing order starting from the lowest frequency from 0 to $N_{sc}^{RB}N_{RB}$−1, where $N_{RB}$ is the number of scheduled RBs for the PDSCH, and the REs used for the PT-RS may be based on:

$$k = k_{ref}^{RE} + (iK_{PT-RS} + k_{ref}^{RB})N_{sc}^{RB}$$

-continued $$K_{ref}^{RB} = \begin{cases} n_{RNTI} \mathrm{mod} K_{PT-RS} & \text{if } N_{RB} \mathrm{mod} K_{PT-RS} = 0 \\ n_{RNTI} \mathrm{mod}(N_{RB} \mathrm{mod} K_{PT-RS}) & \text{otherwise} \end{cases}$$

In the mapping, i=0, 1, 2, . . . ; $k_{ref}^{RE}$ is given by Table 3 for the DM-RS port associated with the PT-RS port; and $n_{RNTI}$ is the RNTI associated with the DCI scheduling the transmission. The parameter $k_{ref}^{RE}$ is a resource element offset that is a function of a higher layer parameter that may be configured for the UE (e.g., by a base station) in a PT-RS downlink configuration information element (IE) as well as the DMRS port associated with the PT-RS.

TABLE 3

The parameter $k_{ref}^{RE}$

| | $k_{ref}^{RE}$ | | | | | | | |
|---|---|---|---|---|---|---|---|---|
| | DM-RS Configuration type 1 resourceElementOffset | | | | DM-RS Configuration type 2 resourceElementOffset | | | |
| DM-RS antenna port P̃ | offset 00 | offset 01 | offset 10 | offset 11 | offset 00 | offset 01 | offset 10 | offset 11 |
| 0 | 0 | 2 | 6 | 8 | 0 | 1 | 6 | 7 |
| 1 | 2 | 4 | 8 | 10 | 1 | 6 | 7 | 0 |
| 2 | 1 | 3 | 7 | 9 | 2 | 3 | 8 | 9 |
| 3 | 3 | 5 | 9 | 11 | 3 | 8 | 9 | 2 |
| 4 | — | — | — | — | 4 | 5 | 10 | 11 |
| 5 | — | — | — | — | 5 | 10 | 11 | 4 |

Figure 4:
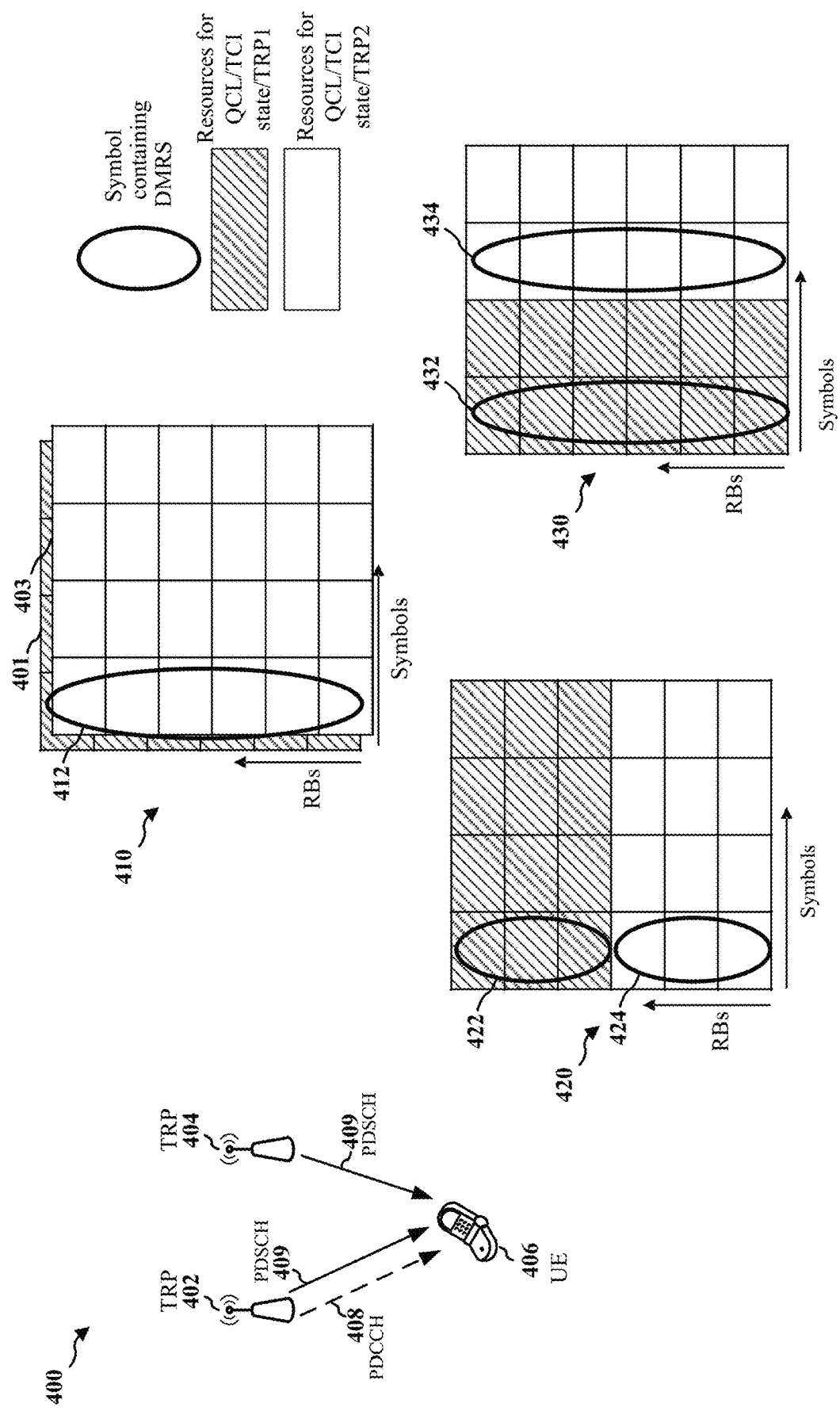
FIG. 4 is a diagram illustrating an example of a UE in multi-TRP operation in accordance with certain aspects of the disclosure.

In some examples, a single downlink control information (DCI) from a base station may schedule downlink transmissions (such as PDSCH) from multiple transmit receive points (TRPs). FIG. 4 illustrates an example of communication 400 between a UE 406 and multiple TRPs (e.g., TRP 402 and TRP 404). In FIG. 4, DCI in a single PDCCH 408 from TRP 402 may schedule PDSCH 409 from both TRP 402 and TRP 404. The PDSCH 409 from TRP 402 may be associated with a first transmission configuration indication (TCI) state, and the PDSCH 409 from the TRP 404 may be associated with a second TCI state. Thus, a single PDCCH 408 may schedule a single PDSCH 409 based on multiple TCI states.

Figure 5:
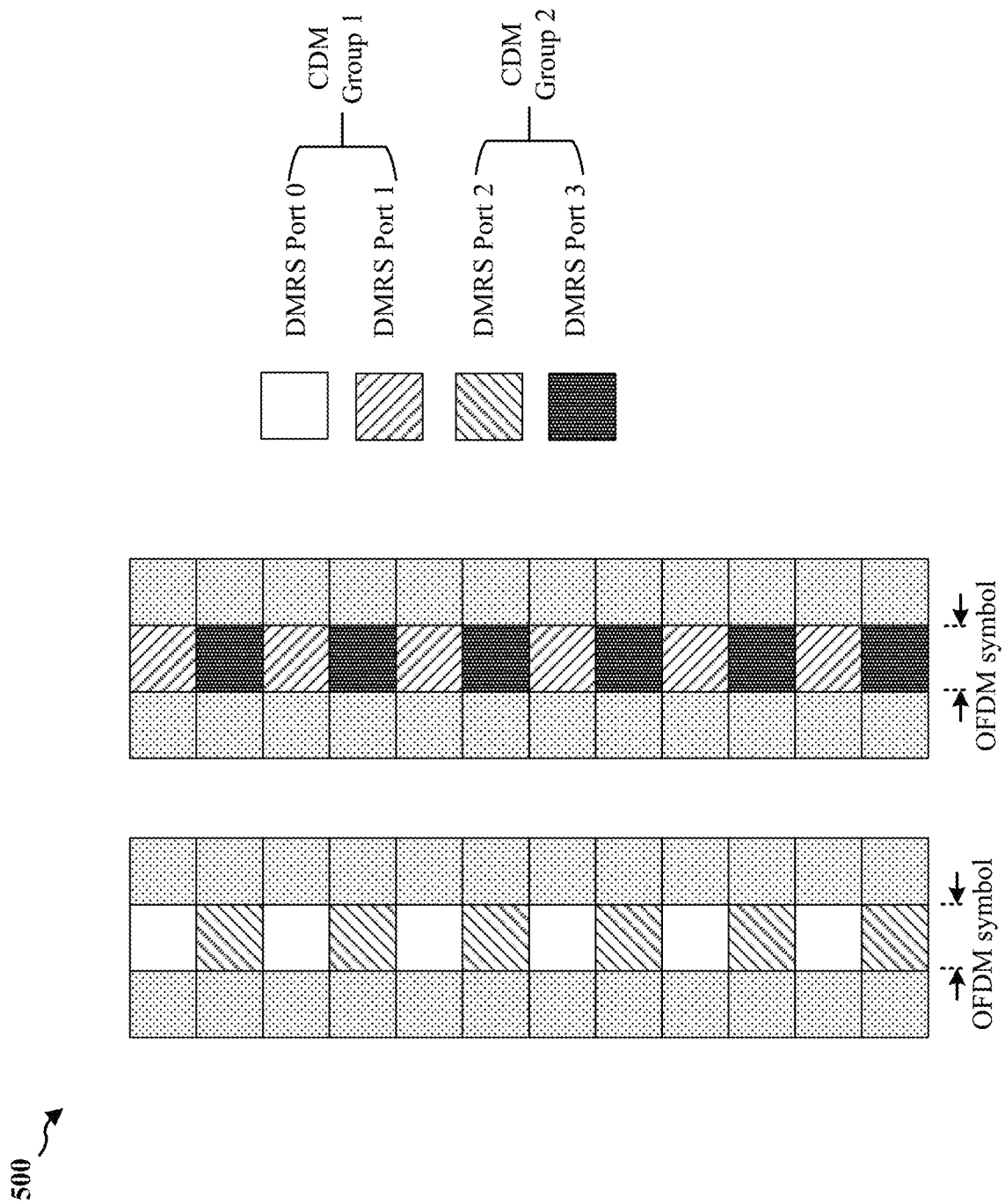
FIG. 5 is a diagram illustrating an example of DMRS ports in accordance with certain aspects of the disclosure.

Different TRPs may transmit the PDSCH using different spatial layers in overlapping RBs and symbols, as illustrated in the diagram of resources 410. Such communication may use space division multiplexing (SDM). Therefore, the PDSCH for the two TCI states may be transmitted using the same time and frequency resources and different spatial layers 401 and 403. Resources that may include DMRS 412 are illustrated for the PDSCH. As the DMRS for the two layers are transmitted using the same time and frequency resources, the DMRS ports corresponding to different TCI states may be in different code division multiplexing (CDM) groups. FIG. 5 illustrates an example pattern 500 for DMRS of different DMRS ports. The pattern in FIG. 5 includes a DMRS configuration type 1 pattern. DMRS port 0 and DMRS port 1 may be used to transmit DMRS for the first layer based on the first TCI state, and DMRS port 2 and DMRS port 3 may be used to transmit the DMRS for the second layer based on the second TCI state. The DMRS for DMRS port 0 and DMRS port 1 may be transmitted in the same REs. The DMRS for DMRS port 2 and DMRS port 3 may be transmitted in the same REs. The CDM applied to DMRS from the different sets, e.g., CDM groups, of DMRS ports enables a receiver to distinguish between the DMRS ports.

Different TRPs may transmit the PDSCH using different RBs using frequency division multiplexing (FDM), as illustrated in the diagram of resources 420. Therefore, the PDSCH for the first TCI state may be transmitted using a first set of frequency resources and the PDSCH for the second TCI may be transmitted using a second set of frequency resources. Separate frequency resources may be used for DMRS 422 for the first TCI state and the DMRS 424 for the second TCI state.

Different TRPs may transmit the PDSCH using different symbols (e.g., OFDM symbols) using time division multiplexing (TDM), as illustrated in the diagram of resources 430. Therefore, the PDSCH for the first TCI state may be transmitted using a first set of symbols and the PDSCH for the second TCI may be transmitted using a second set of symbols. Separate symbols may be used for DMRS 432 for the first TCI state and the DMRS 434 for the second TCI state.

When a single DCI is used to schedule a multiple TCI state transmission, such as illustrated in FIG. 4, the TCI field in the DCI may indicate the two TCI states to enable a UE to receive the scheduled PDSCH using the two TCI states. The QCL indication of DMRS for PDSCH may be indicated via DCI signaling. The TCI field in the DCI may indicate the two QCL relationships for the two TCI states with reference to two reference signal (RS) sets. A TCI indication may be provided in which each TCI code point in a DCI may correspond to one TCI state or to two TCI states. Such a TCI indication may be used, for example, for enhanced mobile broadband (eMBB) communication or URLLC communication.

A base station may be able to switch (e.g., dynamically switch) between using multiple TCI states (e.g., using multiple TRPs) and a single TCI state transmission of PDSCH. The base station may transmit a TCI field in the DCI that indicates one TCI in order to indicate to the UE that the transmission will be from a single TRP. The base station may transmit a TCI field in the DCI that indicates two TCI states in order to indicate to the UE that the transmission will be from multiple TRPs.

For an FDM scheme, as described in connection with the diagram of resources 420, the DCI may indicate the scheduled RBs using a frequency domain resource assignment (FDRA) field. The assignment of RBs to a first TCI state and a second TCI state within the scheduled RBs may be based on a comb-like frequency resource allocation between TRPs for the NRB scheduled RBs. Such an FDM scheme may be applied, e.g., for URLLC communication. For a wideband PRG, the first NRB/2 RBs may be assigned to communication using the first TCI state, and the second NRB/2 RBs may be assigned to communication using the second TCI state. For a PRG size of 2 or 4 RBs, even PRGs within the allocated FDRA may be assigned to communication using the first TCI state, and odd PRGs within the allocated FDRA may be assigned to communication using the second TCI state.

As presented herein, a UE that is scheduled for one PDSCH with DMRS ports in two or more DMRS CDM groups that are associated with two TCI states, such as described in connection with resources 410 in FIG. 4 and DMRS pattern 500 in FIG. 5, may be configured for PT-RS using two PT-RS ports. Therefore, rather than limiting PT-RS to a single port, the PT-RS may be transmitted to the UE using two PT-RS ports.

Figure 6:
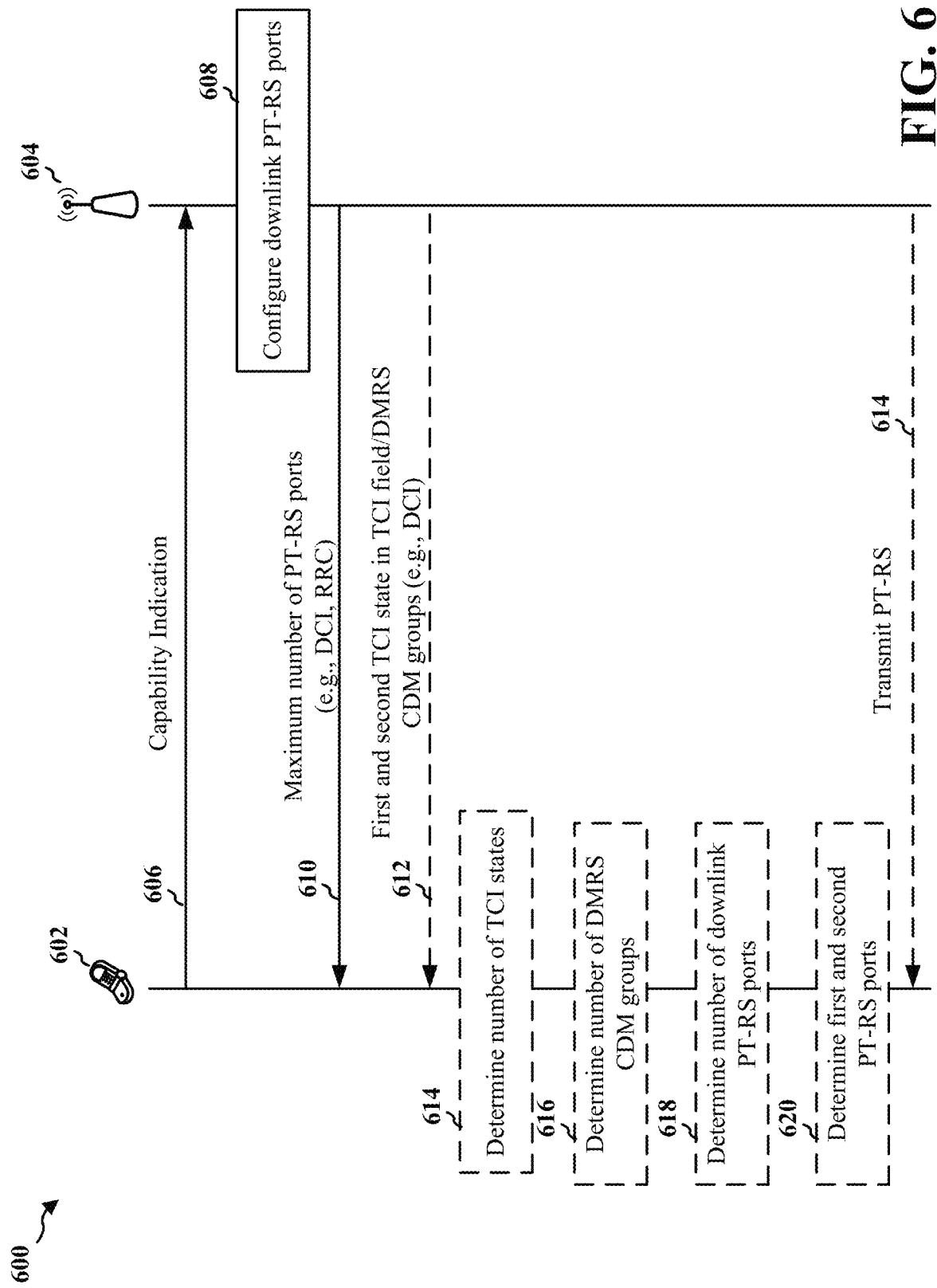
FIG. 6 is a call flow diagram of signaling between a UE and a base station in accordance with certain aspects of the disclosure.

FIG. 6 illustrates an example communication flow 600 between a UE 602 and a base station 604 based on SDM communication using multiple TCI states for a single PDSCH from different TRPs. The UE 602 may send an indication 606 of the UE's capability of supporting more than one port for PT-RS to the base station 604. If the UE 602 indicates the capability to support more than one PT-RS port, the base station 604 may configure the UE 602 for a number of downlink PT-RS ports, as illustrated at 608. The number may correspond to a maximum number of PT-RS ports. In some examples, the maximum number may correspond to two PT-RS ports. The base station 608 may transmit the determined maximum number of PT-RS ports 610 to the UE 602. For example, the base station 604 may transmit the maximum number of PT-RS ports in DCI or in an RRC configuration message. The UE 602 may determine, at 618, a number of PT-RS ports that are actually used to transmit the PT-RS. The actual number may be different than the configured maximum number of PT-RS ports.

If the base station 604 configures the UE 602 for a maximum number of PT-RS ports of one, the UE 602 may determine that the actual number of PT-RS ports used by the base station 604 is also one. The UE 602 may determine that the base station 604 uses one PT-RS port independent of the number of TCI states configured for the UE 602 and/or independent of a number of DMRS CDM groups. If the base station 604 configures the maximum number of PT-RS ports as one, then the PT-RS may have a single port.

If the base station 604 configures the UE 602 with a maximum number of PT-RS ports that is more than one, the UE 602 may consider additional information to determine the actual number of PT-RS ports used by the base station 604. For example, the UE 602 may consider the number of TCI states indicated in a TCI field of DCI 612 received from the base station 604. The UE 602 may determine, at 614, a number of TCI states for the PDSCH. The UE 602 may consider a number of DMRS CDM groups in the scheduled PDSCH, which may be indicated in an antenna ports field of the DCI 612. At 616, the UE 602 may determine the number of DMRS CDM groups.

For example, if the maximum number of PT-RS is more than one and the number of TCI states for the PDSCH is one, the UE 602 may determine that the PT-RS has a single PT-RS port. The UE 602 may determine the single PT-RS port even if more than one DMRS CDM group is indicated. If the maximum number of PT-RS is more than one and the number of DMRS CDM groups for the PSCH is one, the UE 602 may determine that the PT-RS has a single PT-RS port. The UE 602 may determine the single PT-RS port even if more than one TCI state is indicated. Therefore, if either a single TCI state is indicated or a single DMRS CDM group is indicated, the UE 602 may determine that a single PT-RS port is used for the PT-RS.

If multiple TCI states are indicated along with multiple DMRS CDM groups being indicated by the base station 604, the UE 602 may determine that more than one PT-RS port is used for the PT-RS. For example, the UE 602 may determine that two PT-RS ports are used for the PT-RS.

If the UE 602 determines, at 618, that the base station 604 uses multiple PT-RS ports, the UE 602 may determine, at 620, the PT-RS ports. In an example with two PT-RS ports, the first PT-RS port may be associated with the lowest indexed DMRS port within the DMRS ports corresponding to the first indicated TCI state. The second PT-RS port may be associated with the lowest indexed DMRS port within the DMRS ports corresponding to the second indicated TCI state. The UE 602 may determine the first and second TCI states from the TCI field of the DCI, for example, the DCI field that indicates the two TCI states for the PDSCH.

The first and second TCI states may also be associated with first and second DMRS CDM groups, respectively. Therefore, in some examples, the first PT-RS port may be associated with the lowest indexed DMRS port within the DMRS ports in the first indicated DMRS CDM group, and the second PT-RS port may be associated with the lowest indexed DMRS port within the DMRS ports in the second indicated DMRS CDM group.

The base station 604 may transmit the PT-RS 614 and the UE 602 may receive the PT-RS 614 transmitted by the base station 604 based on the determination of the number of downlink PT-RS ports, as determined at 618, and/or the PT-RS ports, as determined at 620.

Figure 7:
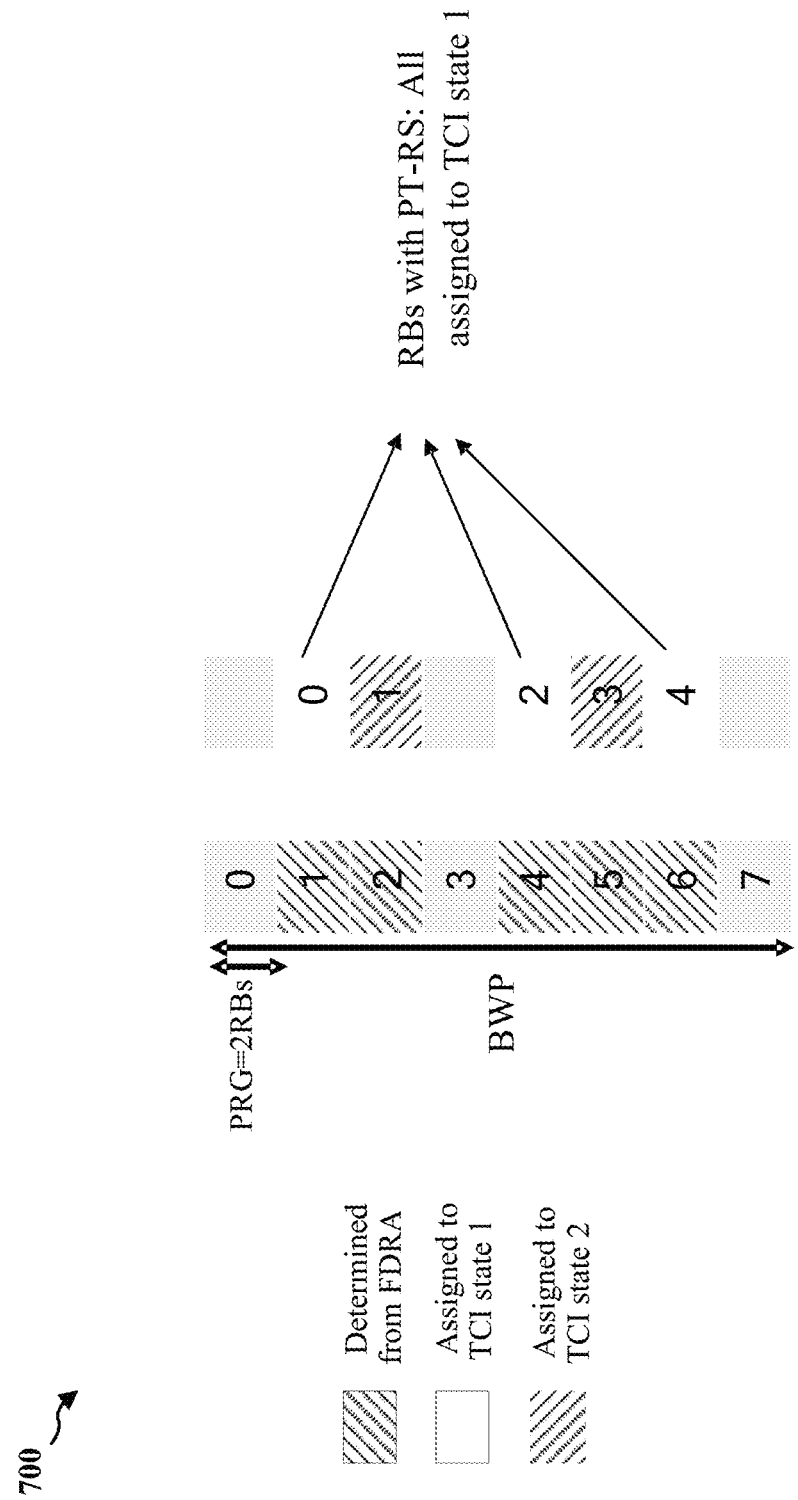
FIG. 7 is a diagram illustrating an example of PRG configurations in accordance with certain aspects of the disclosure.

FIG. 7 illustrates an example 700 of a PRG of two RBs. In some aspects, where resources are allocated for PT-RS for downlink transmissions based on two TCI states, a PT-RS allocation can result in a downlink transmission corresponding to a TCI state containing no resources allocated for PT-RS, and can result in all of the resources allocated for PT-RS being associated with a single TCI state. For example, where the PRG size is 2 or 4, every other PRG may be assigned to a TCI state. For example, if the PRG size is 2 RBs, and a PT-RS density in the frequency domain is 4 (e.g., K=4), then every 4 RBs will have PT-RS. However, all the RBs with PT-RS will be assigned to only one of the TCI states. As shown in the example 700 of FIG. 7, the RBs with PT-RS are assigned to TCI state 1, and no RBs having PT-RS will be assigned to TCI state 2. This is due to the PRG having a size of 2, such that even PRGs within the allocated FDRA may be assigned to communication using the first TCI state, and odd PRGs within the allocated FDRA may be assigned to communication using the second TCI state.

Figure 8:
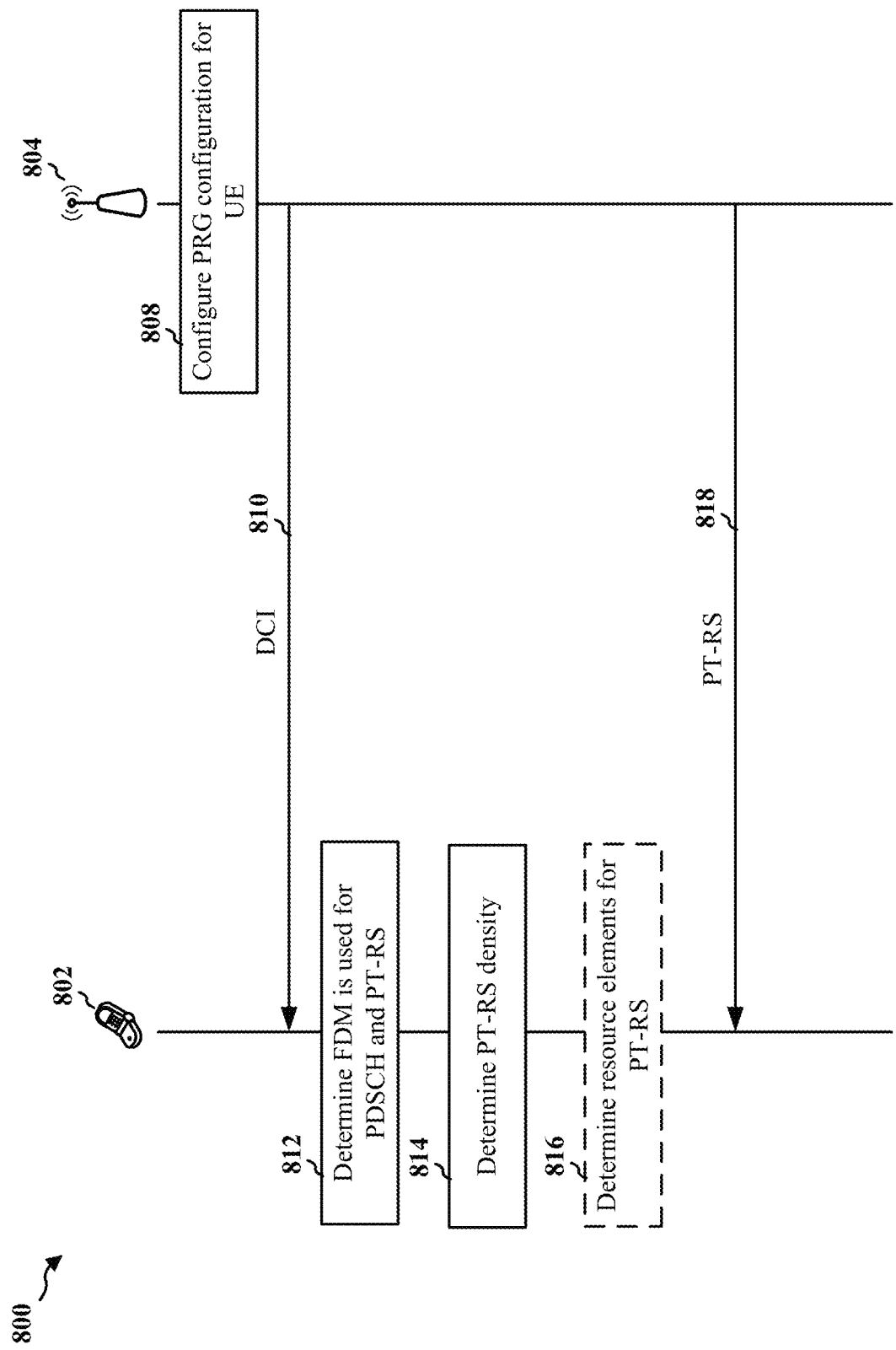
FIG. 8 is another call flow diagram of signaling between a UE and a base station in accordance with certain aspects of the disclosure.

FIG. 8 illustrates an example communication flow 800 between a UE 802 and a base station 804 based on FDM communication using multiple TCI states and a PRG size of two RBs. The base station 804 may be configured, in some aspects, to avoid the issue of having the RBs with PT-RS being assigned to only one TCI state. The base station 804 may configure a PRG configuration for a UE, as illustrated at 808. The base station 804 may configure the UE 802 for a PRG of two RBs. In some aspects, when FDM communication is used and the PRG size is two RBs and the PT-RS density in the frequency domain is four (e.g., K=4), the base station 804 may use a PRG other than two RBs when the PT-RS density in the frequency domain is four. The PRG size of two RBs may not used by the base station 804 when the number of RBs is larger than or equal to $N_{RB1}$, wherein $N_{RB1}$ is the threshold that is used to determine the PT-RS density in the frequency domain is four. The base station 804 may configure the threshold $N_{RB1}$ as larger than the number of RBs in the bandwidth part (BWP), such that the PT-RS density in the frequency domain being four is disabled. The base station 804 may configure a number of scheduled RBs to be less than the threshold (e.g., $N_{RB1}$) to avoid the PT-RS density in frequency domain of four.

The base station 804 may transmit a DCI 810 to the UE 802, wherein the DCI 810 may indicate two TCI states for a PDSCH. The DCI 810 may indicate the PRG configuration to the UE 802. The UE 802, at 812, may determine that FDM is to be used for the PDSCH and a PT-RS that will be present in the PDSCH. The UE 802 may determine that FDM will be used based on the DCI 810 or based on RRC signaling. The UE 802, at 814, may be configured to determine the PT-RS density in the frequency domain based on the PRG of two RBs, the two TCI states, and on the determination that FDM is to be used for the PDSCH. In some aspects, the UE 802 determines that the PT-RS density in the frequency domain is two when the number of scheduled RBs is greater than a first threshold number of RBs and when the number of scheduled RBs is greater than a second threshold number of RBs.

In some aspects, the UE 802, at 816, may determine the resource elements for the PT-RS. When FDM is used, the RBs with PT-RS resource elements may be determined separately for RBs assigned to a first TCI state and for RBs assigned to a second TCI state. The UE 802 may determine the first resource elements for the PT-RS based on a first set of RBs for a first TCI state. The UE 802 may determine the second resource elements for the PT-RS based on a second set of RBs for a second TCI state. In some aspects, the first resource elements and the second resource elements may be determined based on an RB offset. The RB offset may be based on a total number of allocated RBs for the first set of RBs and the second set of RBs. In some aspects, the first resource elements may be determined based on a first RB offset that is based on a first number of allocated RBs for the first set of RBs. The second resource elements may be determined based on a second RB offset that is based on a second number of allocated RBs for the second set of RBs. In some aspects, the first resource elements and the second resource elements may be determined based on a common resource element offset. The first resource elements may be determined based on a first configured resource element offset and the second resource elements may be determined based on a second configured resource element offset. In some aspects, the first resource elements and the second resource elements may be determined using the PT-RS density in the frequency domain that is based on a total number of allocated RBs for the first set of RBs and the second set of RBs. In some aspects, the first resource elements may be determined using a first PT-RS density in a frequency domain that is based on a first number of allocated RBs for the first set of RBs. The second resource elements may be determined using a second PT-RS density in the frequency domain that is based on a second number of allocated RBs for the second set of RBs. The UE 802 may use a common set of thresholds to determine the first PT-RS density and the second PT-RS density. In some aspects, the first resource elements may be determined using a first PT-RS density in a frequency domain that is based on a first number of allocated RBs for the first set of RBs, and the second resource elements may be determined using a second PT-RS density in the frequency domain that is based on a second number of allocated RBs for the second set of RBs. The UE 802 may use a first set of thresholds to determine the first PT-RS density and a second set of thresholds to determine the second PT-RS density.

The base station 804 may transmit the PT-RS 818 to the UE 802. The base station 804 may transmit the PT-RS 818 using FDM and using a PT-RS density in the frequency domain that is based on the PRG of two RBs, the two TCI states, and the use of FDM for the PDSCH. In some aspects, the base station 804 may transmit the PT-RS using the PT-RS density, in the frequency domain, of two when a number of scheduled RBs is greater than a first threshold number of RBs and when the number of scheduled RBs is greater than a second threshold number of RBs. In some aspects, the base station 804 may transmit the PT-RS using first resource elements for the PT-RS based on a first set of RBs for a first TCI state and using second resource elements for the PT-RS based on a second set of RBs for a second TCI state.

Figure 9:
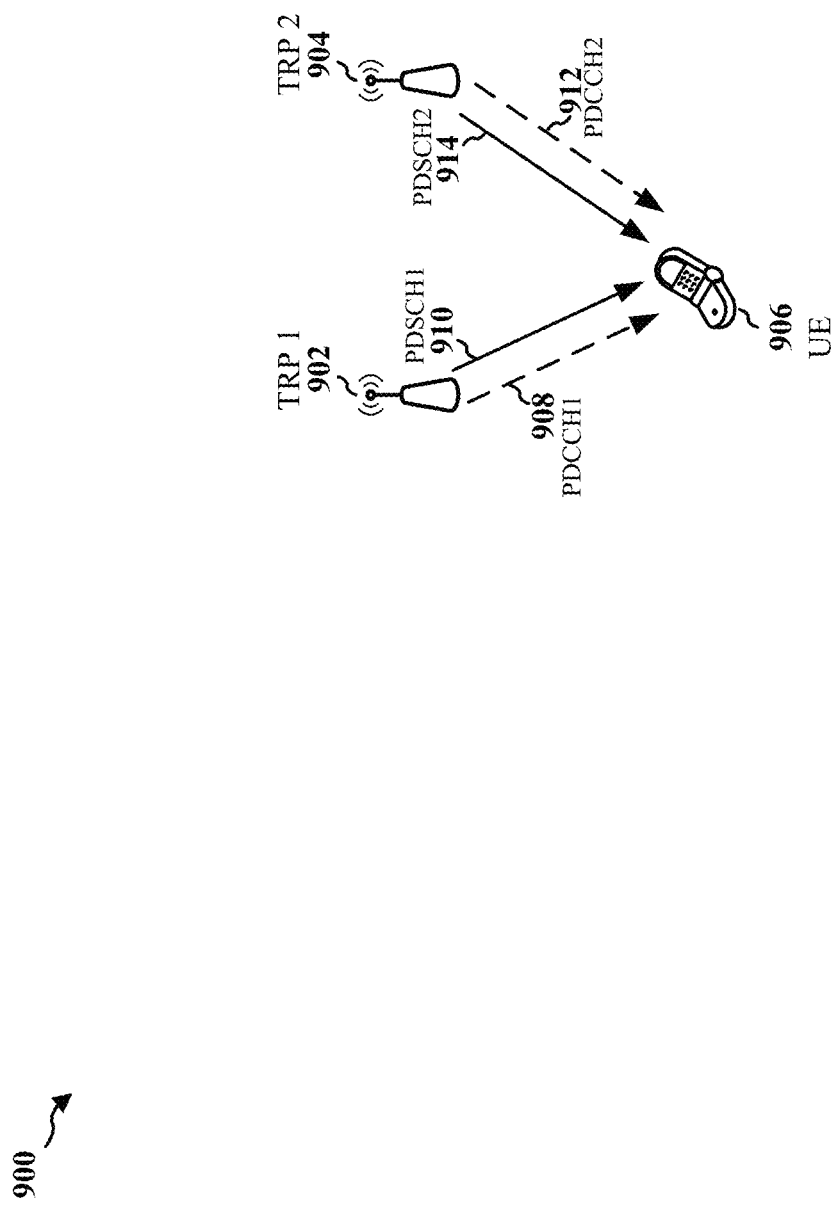
FIG. 9 is a diagram illustrating an example of a UE in multi-TRP operation in accordance with certain aspects of the disclosure.

FIG. 9 illustrates an example 900 of a UE in multi-TRP operation with two DCIs. The example 900 includes a first TRP 902, a second TRP 904, and a UE 906. The UE 906 is configured to receive a first PDCCH 908 transmitted from the first TRP 902, where the first PDCCH 908 may include a DCI allocating resources for a first PDSCH 910. The UE 906 is configured to receive a second PDCCH 912 transmitted from the second TRP 904, where the second PDCCH 912 may include a DCI allocating resources for a second PDSCH 914. The resources scheduled for the two PDSCHs 910, 914 may be fully, partially, or non-overlapping. In instances where the two PDSCHs 910, 914 are fully or partially overlapping, the DMRS configurations may be aligned. For example, the DMRS configuration with respect to the actual number of front loaded DMRS symbols, the actual number of additional DMRS, the actual DMRS symbol location, and the DMRS configuration type would be aligned. The DMRS ports to the two PDSCHs 910, 914 may belong to different DMRS CDM groups. In such instances, the two PDSCHs 910, 914 may have separate PT-RS, such that there is no need for having 2 PT-RS ports. However, PT-RS of one PDSCH may collide with the data resource elements of the other PDSCH.

Figure 10:
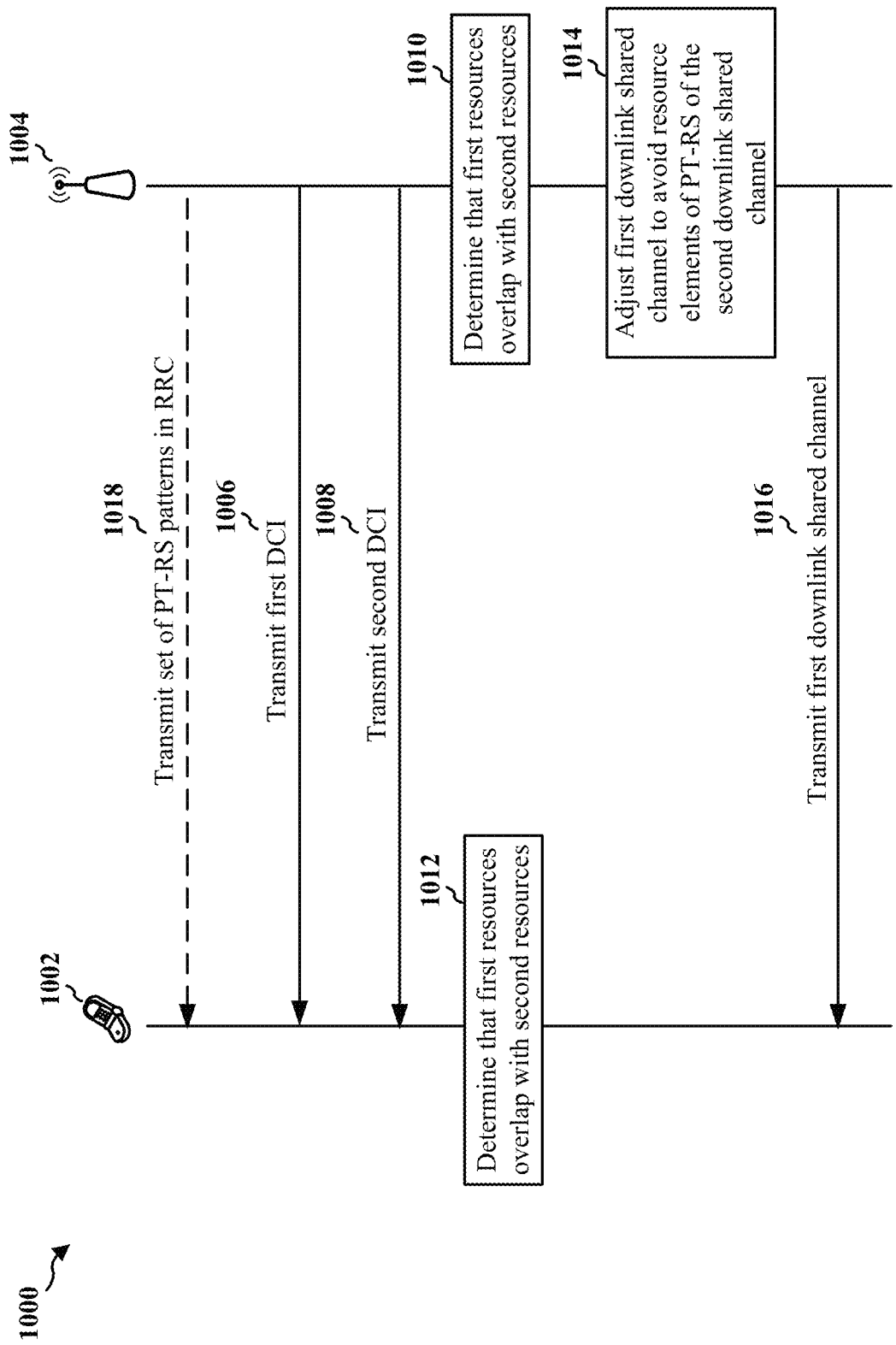
FIG. 10 is another call flow diagram of signaling between a UE and a base station in accordance with certain aspects of the disclosure.

FIG. 10 illustrates an example communication flow 1000 between a UE 1002 and a base station 1004 based on PT-RS for multiple DCI in multi-TRP operation. The base station 1004 may transmit a first DCI 1006 to the UE 1002 (e.g., from a first TRP). The first DCI 1006 may allocate first resources for a first downlink shared channel for a first TRP. In some aspects, the first DCI 1006 may be transmitted in a first CORESET configured with a first value of a higher layer index. The base station 1004 may transmit a second DCI 1008 to the UE 1002 (e.g., from the first TRP or from a second TRP). The second DCI 1008 may allocate second resources for a second downlink shared channel for a second TRP. In some aspects, the second DCI 1008 may be transmitted in a second CORESET configured with a second value of a higher layer index.

In some aspects, the UE 1002, at 1012, may determine that the first resources allocated to the first downlink shared channel overlap with the second resources allocated to the second downlink shared channel. In such instances, the UE 1002 may receive the first downlink shared channel based on a rate matching of resource elements for the first downlink shared channel around a PT-RS of the second downlink shared channel. The UE 1002 may determine the first resources for the first downlink shared channel from the first DCI 1006 and may determine the second resources for the second downlink shared channel including PT-RS resource elements from the second DCI 1008. In some aspects, the UE 1002 may determine PT-RS resource elements for the second downlink shared channel from the first DCI 1006. The first DCI 1006 may indicate a presence of the PT-RS of the second downlink shared channel. The first DCI 1006 may indicate a pattern of the PT-RS of the second downlink shared channel.

In some aspects, the base station 1004, may determine that the first resources overlap with the second resources, at 1010. The base station 1004 may be configured to, at 1014, adjust the first downlink shared channel to avoid resource elements for a PT-RS of the second downlink shared channel. In some aspects, adjusting the first downlink shared channel may include puncturing the first resources of the first downlink shared channel to avoid the resource elements for the PT-RS of the second downlink shared channel. In some aspects, adjusting the first downlink shared channel may include rate matching the first downlink shared channel around the resource elements for the PT-RS of the second downlink shared channel. The first resources for the first downlink shared channel may be indicated in the first DCI 1006 and the second resources for the second downlink shared channel including the resource elements for the PT-RS may be indicated in the second DCI 1008. The base station 1004 may transmit the first downlink shared channel, at 1016, in view of the adjustments to prevent collision between the data resource elements of the first downlink shared channel and the PT-RS of the second downlink shared channel.

In some aspects, the base station 1004 may transmit, at 1018, in RRC signaling, a set of PT-RS patterns. In some aspects, the first DCI 1006 may indicate the pattern for the PT-RS of the second downlink shared channel from the set of PT-RS patterns.

Figure 11:
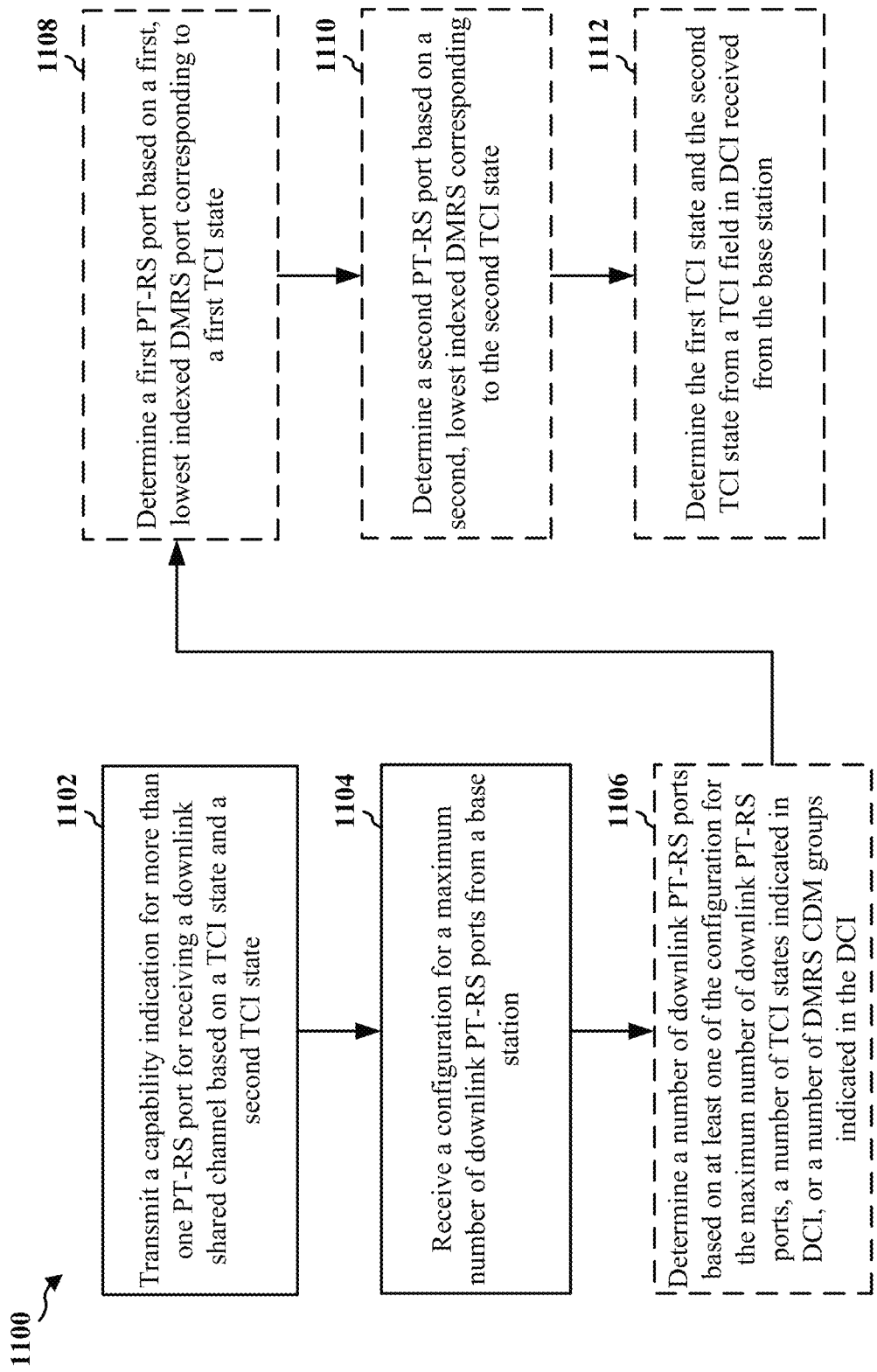
FIG. 11 is a flowchart of a method of wireless communication.

FIG. 11 is a flowchart of a method 1100 of wireless communication. The method may be performed by a UE or a component of a UE (e.g., the UE 104, 350, 406, 706, 802, 902, 1002, 1550, 2150, 2750; the apparatus 1202/1202'; the processing system 1314, which may include the memory 360 and which may be the entire UE 350 or a component of the UE 350, such as the TX processor 368, the RX processor 356, and/or the controller/processor 359. According to various aspects, one or more of the illustrated operations of the method 1100 may be omitted, transposed, and/or contemporaneously performed. Optional aspects are illustrated with a dashed line. The method may enable a UE to provide a capability indication for more than one PT-RS port for receiving a downlink shared channel.

At 1102, the UE may transmit a capability indication to a base station. For example, 1102 may be performed by capability component 1206 of apparatus 1202. The UE may transmit the capability indication for more than one PT-RS port for receiving a downlink shared channel. The downlink shared channel may be based on a first TCI state and a second TCI state. In some aspects, the base station may be a TRP, such that the UE transmits the capability indication to the TRP.

At 1104, the UE may receive a configuration for a maximum number of downlink PT-RS ports. For example, 1104 may be performed by configuration component 1208 of apparatus 1202. The UE may receive the configuration for the maximum number of downlink PT-RS ports from the base station. In some aspects, the base station may be a TRP, such that the UE receives the configuration from the TRP.

In some aspects, for example at 1106, the UE may determine a number of downlink PT-RS ports. For example, 1106 may be performed by determination component 1210 of apparatus 1202. In some aspects, the UE may determine the number of downlink PT-RS ports based on at least one of a configuration for the maximum number of downlink PT-RS ports, a number of TCI states indicted in DCI from the base station, or a number of DMRS CDM groups indicated in the DCI from the base station. In some aspects, the UE may determine the number of downlink PT-RS ports to be one when the maximum number of downlink PT-RS ports is one. In some aspects, the UE may determine the number of downlink PT-RS ports based on at least one of the number of TCI states or the number of DMRS CDM groups, when the maximum number of downlink PT-RS ports is more than one. In some aspects, the UE may determine the number of downlink PT-RS ports is one when the number of TCI states is one or the number of DMRS CDM groups is one. In some aspects, the UE may determine the number of downlink PT-RS ports to be more than one when the number of TCI states is more than one and the number of DMRS CDM groups is more than one.

In some aspects, for example at 1108, the UE may determine a first PT-RS port. For example, 1108 may be performed by first PT-RS port component 1212 of apparatus 1202. The UE may determine the first PT-RS port based on a first, lowest indexed DMRS port corresponding to a first TCI state.

In some aspects, for example at 1110, the UE may determine a second PT-RS port. For example, 1110 may be performed by second PT-RS port component 1214 of apparatus 1202. The UE may determine the second PT-RS port based on a second, lowest indexed DMRS port corresponding to the second TCI state.

In some aspects, for example at 1112, the UE may determine the first and second TCI states. For example, 1112 may be performed by TCI states component 1216 of apparatus 1202. The UE may determine the first TCI state and the second TCI state from a TCI filed in a DCI. The DCI may be received from the base station. As discussed above, in some aspects, the base station may be a TRP.

In some aspects, the UE may determine a first PT-RS port based on a first, lowest indexed DMRS port in a first indicated DMRS CDM group. The first PT-RS port may be associated with the lowest, indexed DMRS port within the DMRS ports in the first indicated DMRS CDM group. In some aspects, the UE may determine a second PT-RS port based on a second, lowest indexed DMRS port in a second indicated DMRS CDM group. The second PT-RS port may be associated with the lowest, indexed DMRS port within the DMRS ports in the second indicated DMRS CDM group. In some aspects, the UE may determine the first indicated DMRS CDM group and the second indicated DMRS CDM group based on the DCI received from the base station. In some aspects, the UE may receive the first PT-RS port and the second PT-RS port based on the quasi co-location (QCL) properties of the corresponding DMRS port. The first PT-RS port may be quasi co-located with the first associated DMRS port (e.g., lowest indexed DMRS port corresponding to the first TCI state). The second PT-RS port may be quasi co-located with the second associated DMRS port (e.g., lowest indexed DMRS port corresponding to the second TCI state).

Figure 12:
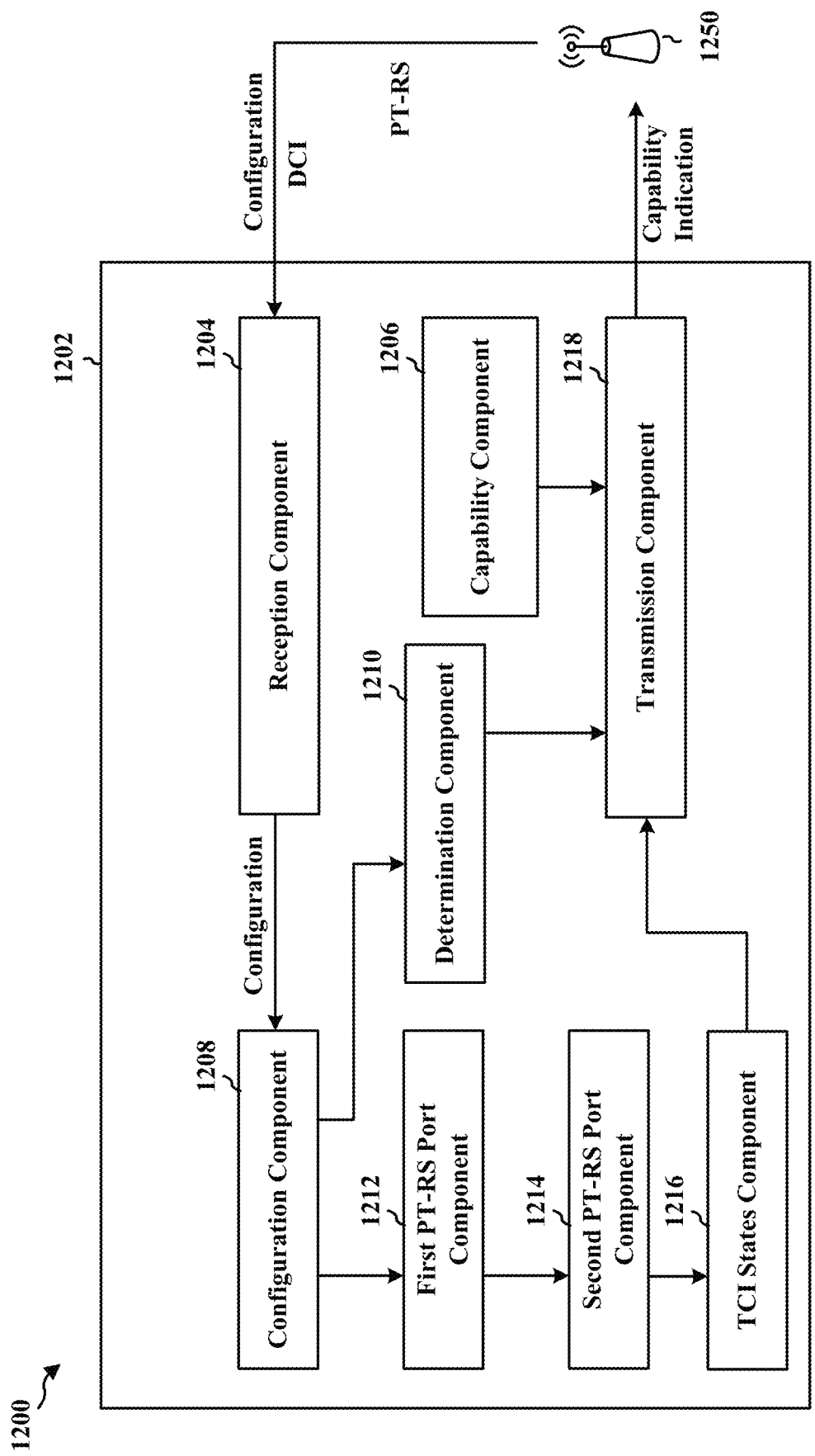
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE or a component of a UE. The apparatus includes a reception component 1204 that may be configured to receive various types of signals/messages and/or other information from other devices, including, for example, the base station 1250. The apparatus includes a capability component 1206 that may transmit a capability indication to a base station, e.g., as described in connection with 1102 of FIG. 11. The apparatus includes a configuration component 1208 that may receive a configuration for a maximum number of downlink PT-RS ports, e.g., as described in connection with 1104 of FIG. 11. The apparatus includes a determination component 1210 that may determine a number of downlink PT-RS ports, e.g., as described in connection with 1106 of FIG. 11. The apparatus includes a first PT-RS port component 1212 that may determine a first PT-RS port, e.g., as described in connection with 1108 and/or 11XX of FIG. 11. The apparatus includes a second PT-RS port component 1214 that may determine a second PT-RS port, e.g., as described in connection with 1110 and/or 11XX of FIG. 11. The apparatus includes a TCI states component 1216 that may determine the first and second TCI states, e.g., as described in connection with 1112 of FIG. 11. The apparatus includes a transmission component 1218 that may be configured to transmit various types of signals/messages and/or other information to other devices, including, for example, the base station 1250.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
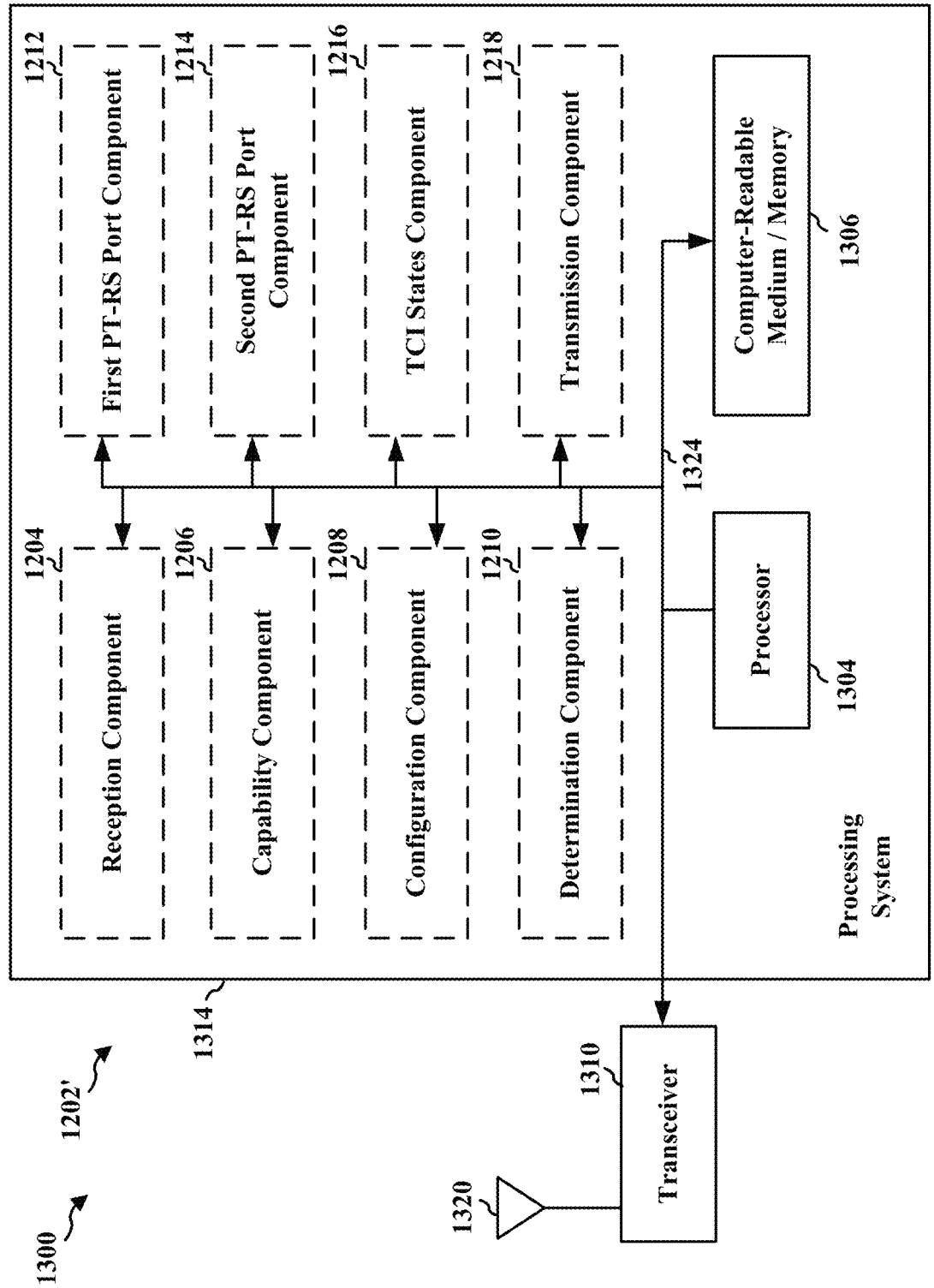
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1218, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359. Alternatively, the processing system 1314 may be the entire UE (e.g., see 350 of FIG. 3).

In one configuration, the apparatus 1202/1202' for wireless communication includes means for transmitting a capability indication for more than one PT-RS port for receiving a downlink shared channel based on a first TCI state and a second TCI state. The apparatus includes means for receiving a configuration for a maximum number of downlink PT-RS ports from a base station. The apparatus further includes means for determining a number of downlink PT-RS ports based on at least one of the configuration for the maximum number of downlink PT-RS ports, a number of TCI states indicated in DCI from the base station, or a number of DMRS CDM groups indicated in the DCI from the base station. The apparatus further includes means for determining a first PT-RS port based on a first, lowest indexed DMRS port corresponding to a first TCI state. The apparatus further includes means for determining a second PT-RS port based on a second, lowest indexed DMRS port corresponding to the second TCI state. The apparatus further includes means for determining the first TCI state and the second TCI state from a TCI field in DCI received from the base station. The apparatus further includes means for determining a first PT-RS port based on a first, lowest indexed DMRS port in a first indicated DMRS CDM group. The apparatus further includes means for determining a second PT-RS port based on a second, lowest indexed DMRS port in a second indicated DMRS CDM group. The apparatus further includes means for determining the first indicated DMRS CDM group and the second indicated DMRS CDM group in DCI received from the base station. The apparatus further includes means for receiving the first PT-RS port and the second PT-RS port based on QCL properties of the corresponding DMRS port. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
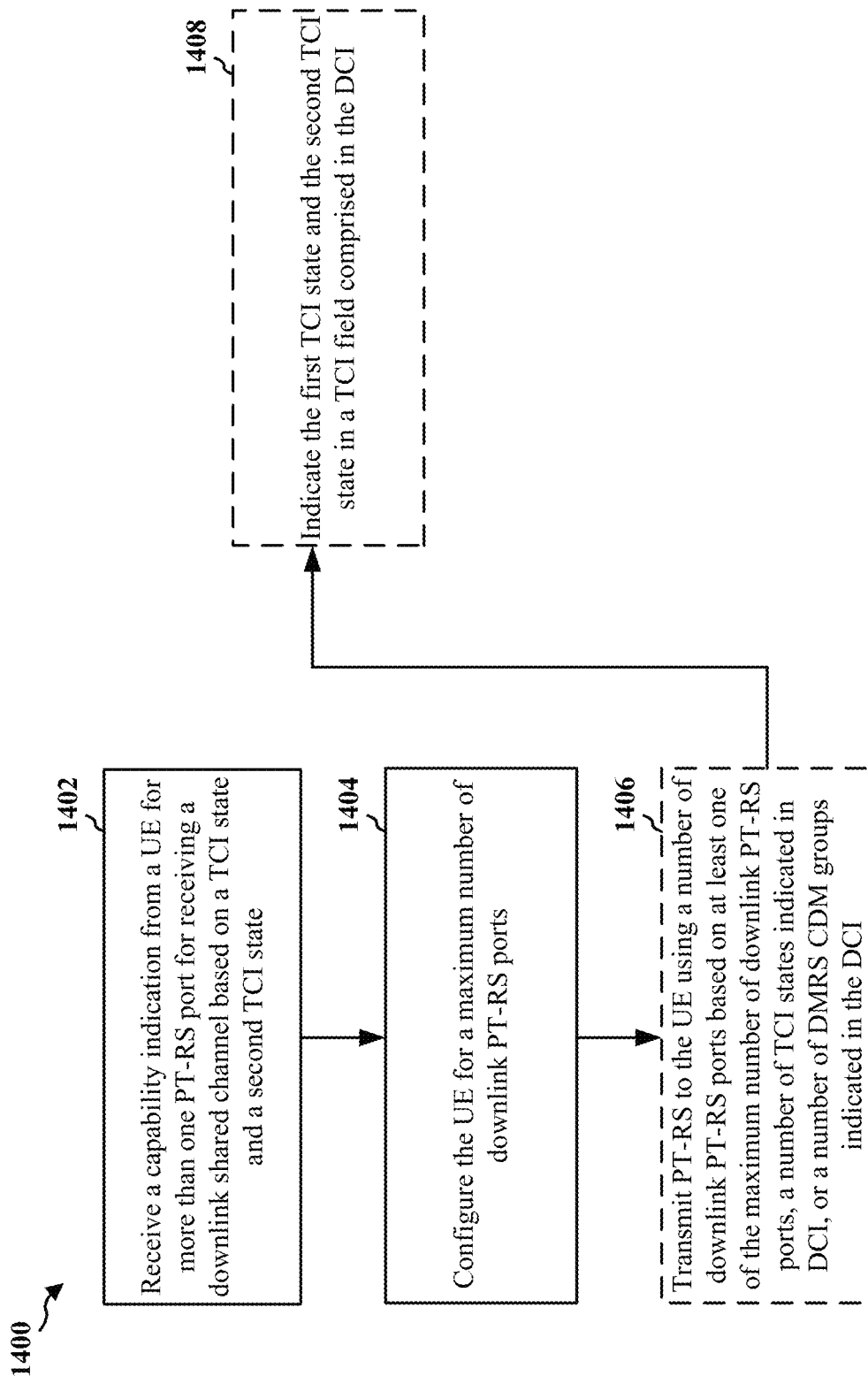
FIG. 14 is a flowchart of a method of wireless communication.

FIG. 14 is a flowchart of a method 1400 of wireless communication. The method may be performed by a base station or a component of a base station (e.g., the base station 102, 180, 310, 702, 704, 804, 904, 1004, 1250, 1850, 2450; the apparatus 1502/1502'; the processing system 1614, which may include the memory 376 and which may be the entire base station 310 or a component of the base station 310, such as the TX processor 316, the RX processor 370, and/or the controller/processor 375). According to various aspects, one or more of the illustrated operations of the method 1400 may be omitted, transposed, and/or contemporaneously performed. The method may enable a base station to configure a UE with a maximum number of downlink PT-RS ports.

At 1402, the base station may receive a capability indication from a UE. For example, 1402 may be performed by capability component 1506 of apparatus 1502. The capability indication may indicate that the UE may support more than one PT-RS port for receiving a downlink shared channel. The downlink shared channel may be based on a first TCI state and a second TCI state.

At 1404, the base station may configure the UE for a maximum number of downlink PT-RS ports. For example, 1404 may be performed by configuration component 1508 of apparatus 1502.

In some aspects, for example at 1406, the base station may transmit PT-RS to the UE using a number of downlink PT-RS ports. For example, 1406 may be performed by PT-RS component 1510 of apparatus 1502. The base station may transmit the PT-RS to the UE using the number of downlink PT-RS ports based on at least one of the maximum number of downlink PT-RS ports, a number of TCI states indicated in DCI from the base station, or a number of DMRS CDM groups indicated in the DCI from the base station. In some aspects, the base station may transmit the PT-RS using a single PT-RS port when the maximum number of downlink PT-RS ports is one. In some aspects, the base station may transmit the PT-RS using the number of downlink PT-RS ports based on at least one of the number of TCI states or the number of DMRS CDM groups when the maximum number of downlink PT-RS ports is more than one. In some aspects, the base station may transmit the PT-RS using a single PT-RS port when the number of TCI states is one or the number of DMRS CDM groups is one. In some aspects, the base station may transmit the PT-RS using a more than one PT-RS port when the number of TCI states is more than one and the number of DMRS CDM groups is more than one. In some aspects, the base station may transmit the PT-RS using a first PT-RS port that corresponds to a first, lowest indexed DMRS port for a first TCI state and transmits the PT-RS using a second PT-RS port that corresponds to a second, lowest indexed DMRS for the second TCI state. In some aspects, the base station may transmit the PT-RS using a first PT-RS port that corresponds to a first, lowest indexed DMRS port for a first indicated DMRS CDM group. The base station may transmit the PT-RS using a second PT-RS port the corresponds to a second, lowest indexed DMRS port for a second indicated DMRS CDM group. In some aspects, the first indicated DMRS CDM group and the second indicated DMRS CDM group may be indicated in the DCI from the base station. In some aspects, the first PT-RS port and the second PT-RS port may be transmitted based on quasi co-location (QCL) properties of the corresponding DMRS port.

In some aspects, for example at 1408, the base station may indicate the first and second TCI states. For example, 1408 may be performed by indication component 1512 of apparatus 1502. The base station may indicate the first TCI state and the second TCI state in a TCI field comprised in the DCI.

Figure 15:
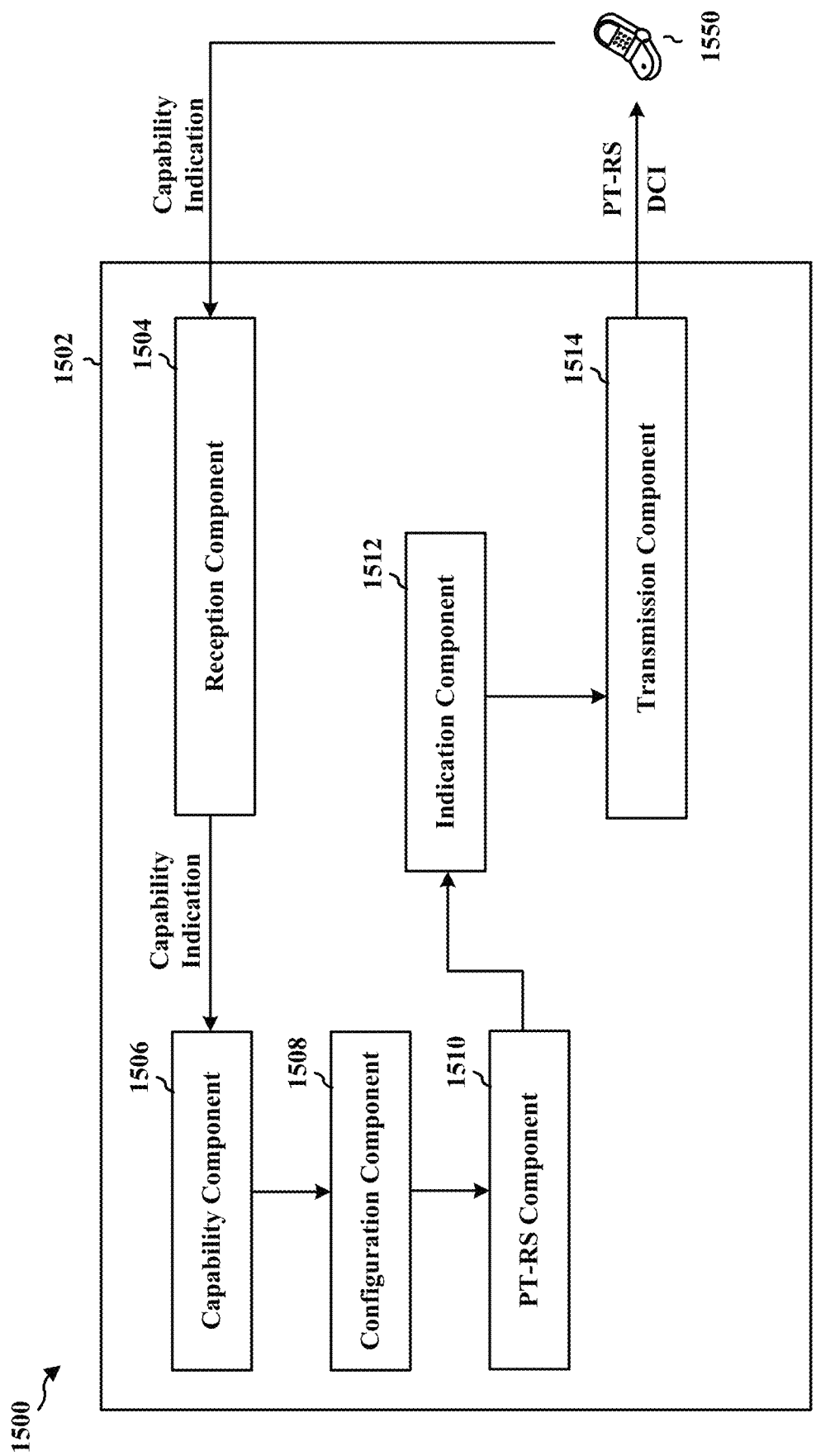
FIG. 15 is a conceptual data flow diagram illustrating the data flow between different means/components in an example apparatus.

FIG. 15 is a conceptual data flow diagram 1500 illustrating the data flow between different means/components in an example apparatus 1502. The apparatus may be a base station or a component of a base station. The apparatus includes a reception component 1504 that may be configured to receive various types of signals/messages and/or other information from other devices, including, for example, the UE 1550. The apparats includes a capability component 1506 that may receive a capability indication from a UE, e.g., as described in connection with 1402 of FIG. 14. The apparatus includes a configuration component 1508 that may configure the UE for a maximum number of downlink PT-RS ports, e.g., as described in connection with 1404 of FIG. 14. The apparatus includes a PT-RS component 1510 that may transmit PT-RS to the UE using a number of downlink PT-RS ports, e.g., as described in connection with 1406 of FIG. 14. The apparatus includes an indication component 1512 that may indicate the first and second TCI states, e.g., as described in connection with 1408 of FIG. 14. The apparatus includes a transmission component 1514 that may be configured to transmit various types of signals/messages and/or other information to other devices, including, for example, the UE 1550.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
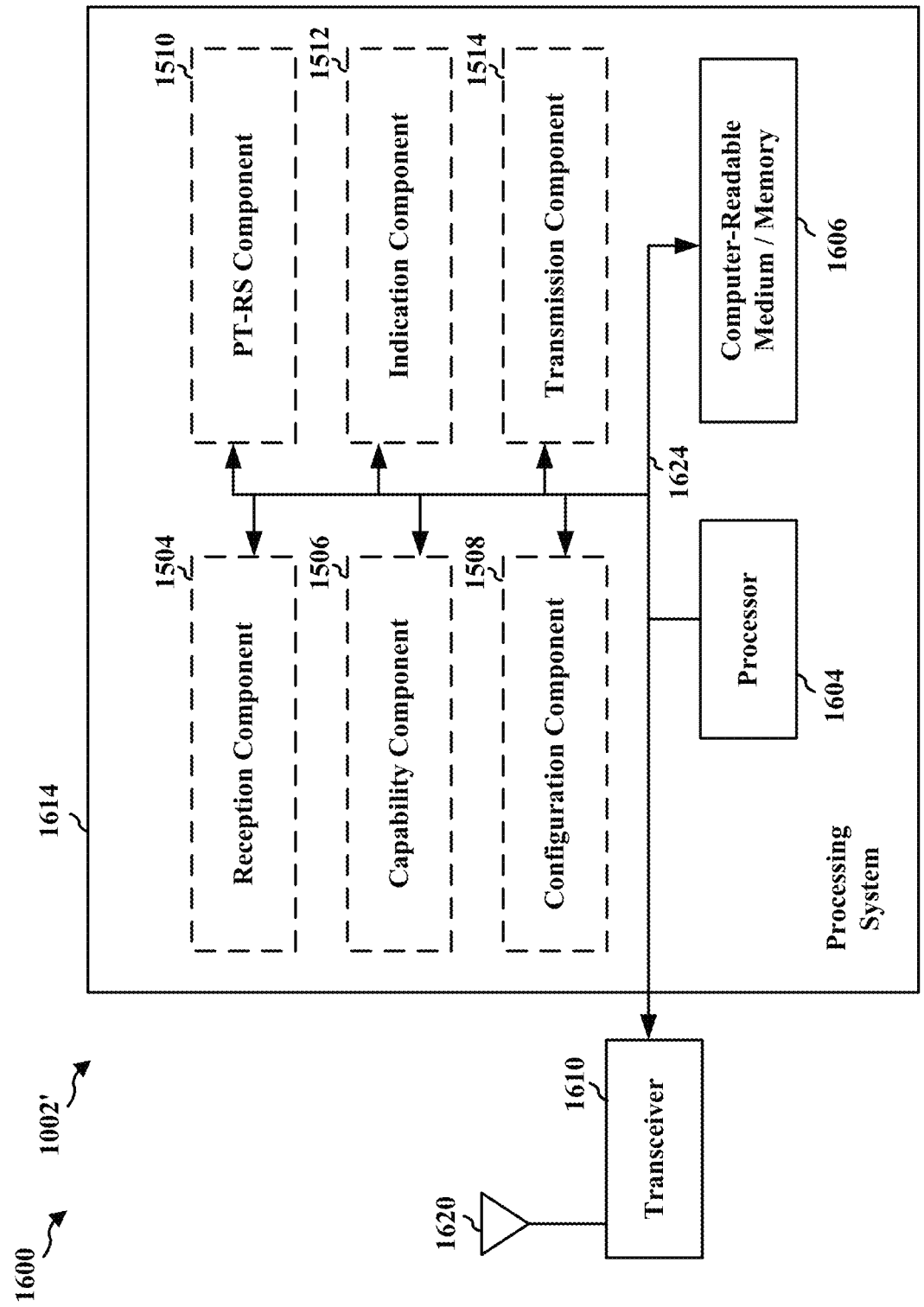
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1514, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514. The components may be software components running in the processor 1604, resident/stored in the computer readable medium/memory 1606, one or more hardware components coupled to the processor 1604, or some combination thereof. The processing system 1614 may be a component of the base station 310 and may include the memory 376 and/or at least one of the TX processor 316, the RX processor 370, and the controller/processor 375. Alternatively, the processing system 1614 may be the entire base station (e.g., see 310 of FIG. 3).

In one configuration, the apparatus 1502/1502' for wireless communication includes means for receiving a capability indication from a UE for more than one PT-RS port for receiving a downlink shared channel based on a first TCI state and a second TCI state. The apparatus includes means for configuring the UE for a maximum number of downlink PT-RS ports. The apparatus further includes means for transmitting PT-RS to the UE using a number of downlink PT-RS ports based on at least one of the maximum number of downlink PT-RS ports, a number of TCI states indicated in DCI from the base station, or a number of DMRS CDM groups indicated in the DCI from the base station. The apparatus further includes means for indicating the first TCI state and the second TCI state in a TCI field comprised in the DCI. The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 17:
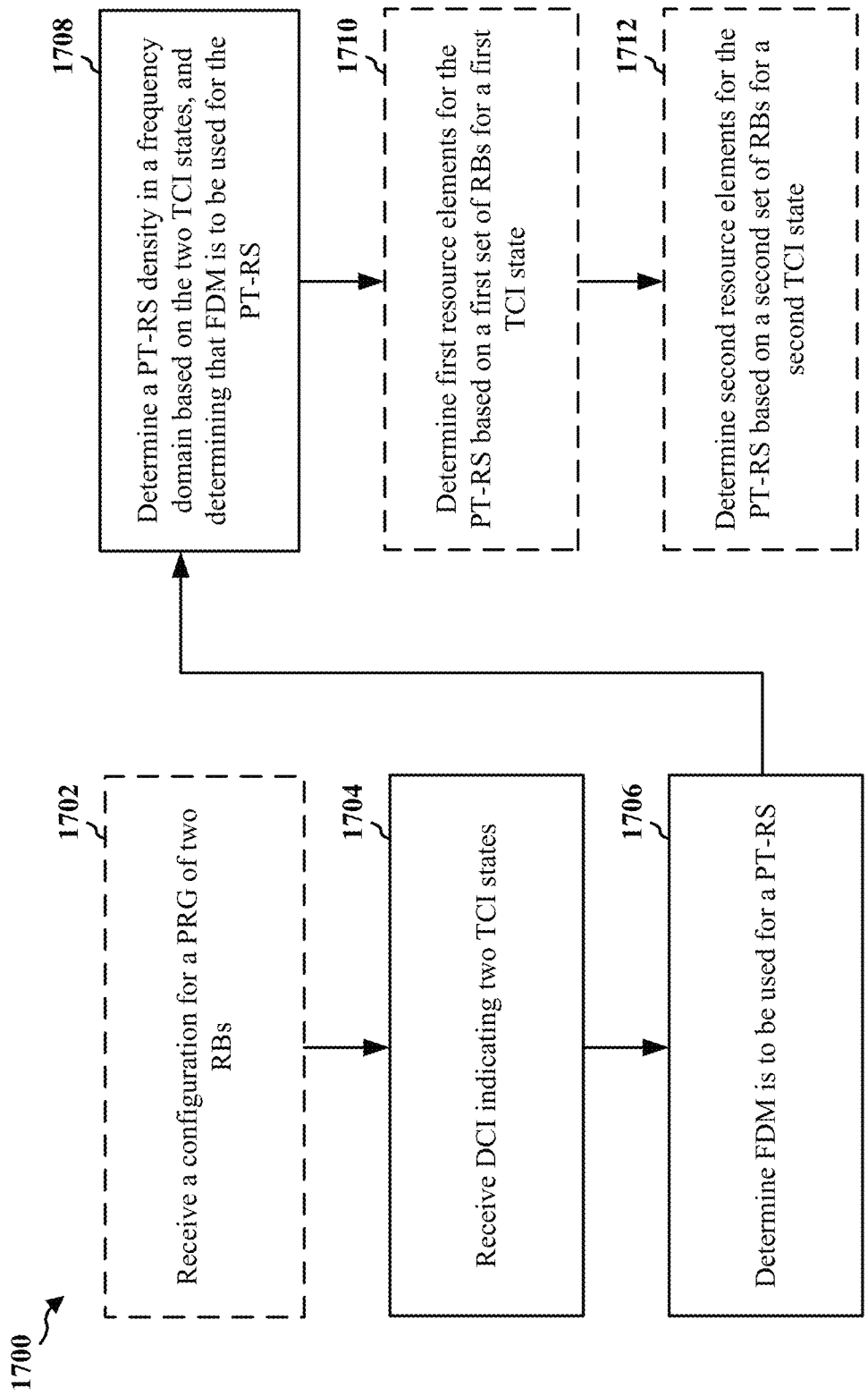
FIG. 17 is a flowchart of a method of wireless communication.

FIG. 17 is a flowchart of a method 1700 of wireless communication. The method may be performed by a UE or a component of a UE (e.g., the UE 104, 350, 406, 706, 802, 902, 1002, 1550, 2150, 2750; the apparatus 1802/1802'; the processing system 1914, which may include the memory 360 and which may be the entire UE 350 or a component of the UE 350, such as the TX processor 368, the RX processor 356, and/or the controller/processor 359. According to various aspects, one or more of the illustrated operations of the method 1700 may be omitted, transposed, and/or contemporaneously performed. Optional aspects are illustrated with a dashed line. The method may enable a UE to determine a PT-RS density in a frequency domain.

At 1704, the UE may receive DCI indicating two TCI states. For example, 1704 may be performed by DCI component 1808 of apparatus 1802. The UE may receive the DCI from the base station. The DCI may indicate two TCI states for a PDSCH.

At 1706, the UE may determine FDM is to be used for the PDSCH. For example, 1706 may be performed by FDM component 1810 of apparatus 1802. In some aspects, the UE may determine that FDM is used for the PDSCH and a PT-RS present in the PDSCH. The UE may determine that FDM is used for the PDSCH and the PT-RS based on RRC signaling or the DCI.

At 1708, the UE may determine a PT-RS density in a frequency domain. For example, 1708 may be performed by PT-RS density component 1812 of apparatus 1802. The UE may determine the PT-RS density in the frequency domain based on the two TCI states, and determining that FDM is to be used for the PDSCH.

In some aspects, for example at 1702, the UE may receive a configuration for a precoding resource block group (PRG). For example, 1702 may be performed by PRG component 1806 of apparatus 1802. The configuration for the PGR may be for two resource blocks (RBs). The UE may receive the configuration for the PGR from the base station. At 1708, the UE may further determine the PT-RS density based on the PRG of the two RBs.

In some aspects, the UE may determine that the PT-RS density in the frequency domain is two when a number of scheduled RBs is greater than a first threshold number of RBs and when the number of scheduled RBs is greater than a second threshold number of RBs.

In some aspects, for example at 1710, the UE may determine first resource elements for the PT-RS. For example, 1710 may be performed by first resource elements component 1814 of apparatus 1802. The UE may determine the first resource elements for the PT-RS based on a first set of RBs for a first TCI state.

In some aspects, for example at 1712, the UE may determine second resource elements for the PT-RS. For example, 1712 may be performed by second resource elements component 1816 of apparatus 1802. The UE may determine the second resource elements for the PT-RS based on a second set of RBs for a second TCI state. In some aspects, the first resource elements and the second resource elements may be determined based on a RB offset that is based on a total number of allocated RBs for the first set of RBs and the second set of RBs. In some aspects, the first resource elements may be determined based on a first RB offset that is based on a first number of allocated RBs for the first set of RBs, and the second resource elements may be determined based on a second RB offset that is based on a second number of allocated RBs for the second set of RBs. In some aspects, the first resource elements and the second resource elements may be determined based on a common resource element offset. In some aspects, the first resource elements may be determined based on a first configured resource element offset, and the second resource elements may be determined based on a second configured resource element offset. In some aspects, the first resource elements and the second resource elements may be determined using the PT-RS density in the frequency domain that is based on a total number of allocated RBs for the first set of RBs and the second set of RBs. In some aspects, the first resource elements may be determined using a first PT-RS density in a frequency domain that is based on a first number of allocated RBs for the first set of RBs, and the second resource elements may be determined using a second PT-RS density in the frequency domain that is based on a second number of allocated RBs for the second set of RBs. The UE may use a common set of thresholds to determine the first PT-RS density and the second PT-RS density. In some aspects, the first resource elements may be determined using a first PT-RS density in a frequency domain that is based on a first number of allocated RBs for the first set of RBs, and the second resource elements may be determined using a second PT-RS density in the frequency domain that is based on a second number of allocated RBs for the second set of RBs. The UE may use a first set of thresholds to determine the first PT-RS density and a second set of thresholds to determine the second PT-RS density.

Figure 18:
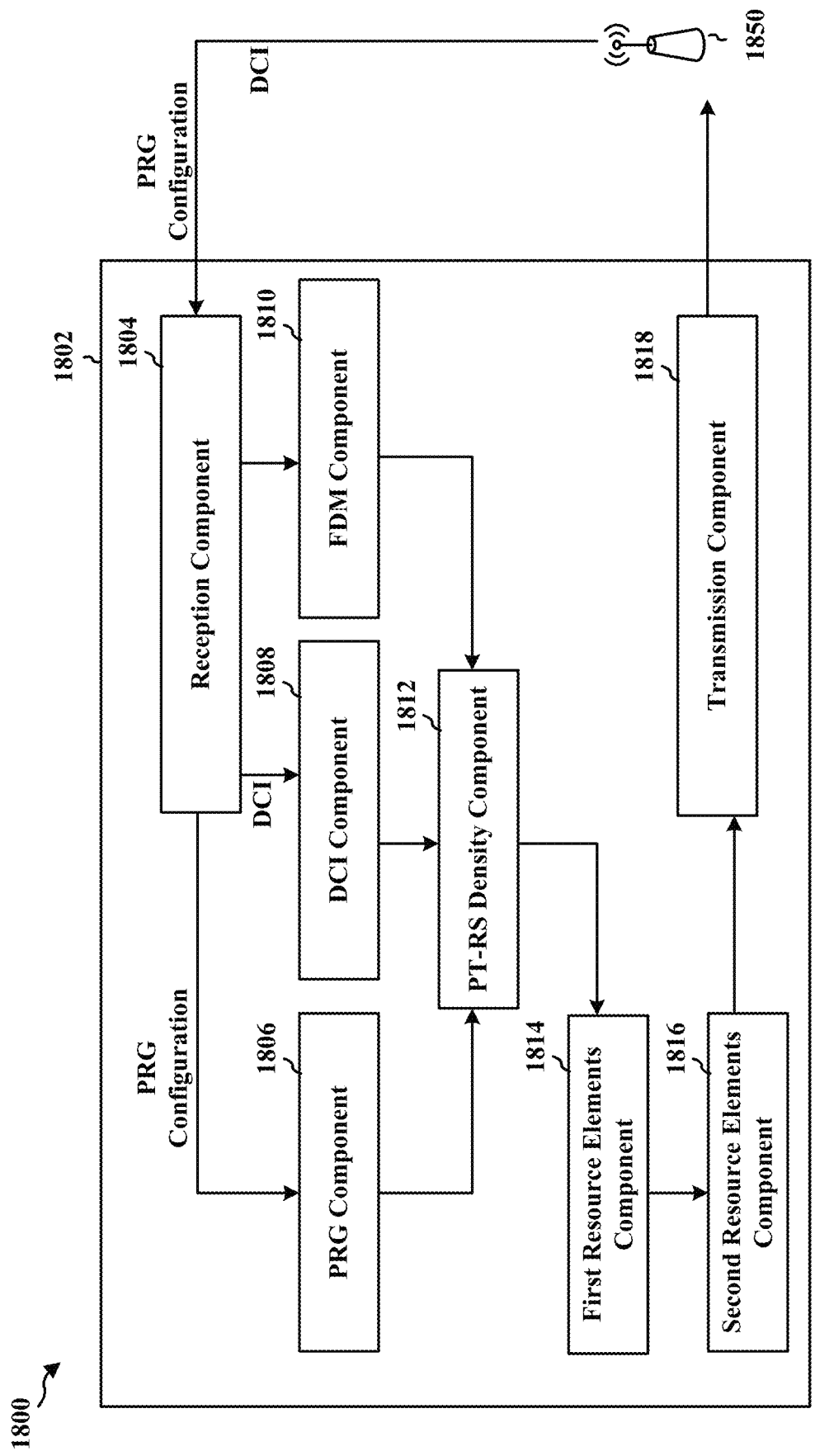
FIG. 18 is a conceptual data flow diagram illustrating the data flow between different means/components in an example apparatus.

FIG. 18 is a conceptual data flow diagram 1800 illustrating the data flow between different means/components in an example apparatus 1802. The apparatus may be a UE or a component of a UE. The apparatus includes a reception component 1804 that may be configured to receive various types of signals/messages and/or other information from other devices, including, for example, the base station 1850. The apparatus includes a PRG component 1806 that may receive a configuration for a PRG, e.g., as described in connection with 1702 of FIG. 17. The apparatus includes a DCI component 1808 that may receive DCI indicating two TCI states for a PDSCH, e.g., as described in connection with 1704 of FIG. 17. The apparatus includes an FDM component 1810 that may determine FDM is to be used for the PDSCH and a PT-RS present in the PDSCH, e.g., as described in connection with 1706 of FIG. 17. The apparatus includes a PT-RS density component 1812 that may determine a PT-RS density in a frequency domain, e.g., as described in connection with 1708 of FIG. 17. The apparatus includes a first resource elements component 1814 that may determine first resource elements for the PT-RS, e.g., as described in connection with 1710 of FIG. 17. The apparatus includes a second resource elements component 1816 that may determine second resource elements for the PT-RS, e.g., as described in connection with 1712 of FIG. 17. The apparatus includes a transmission component 1818 that may be configured to transmit various types of signals/messages and/or other information to other devices, including, for example, the base station 1850.

The apparatus may include additional components that perform each of the blocks of the algorithm in the aforementioned flowchart of FIG. 17. As such, each block in the aforementioned flowchart of FIG. 17 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
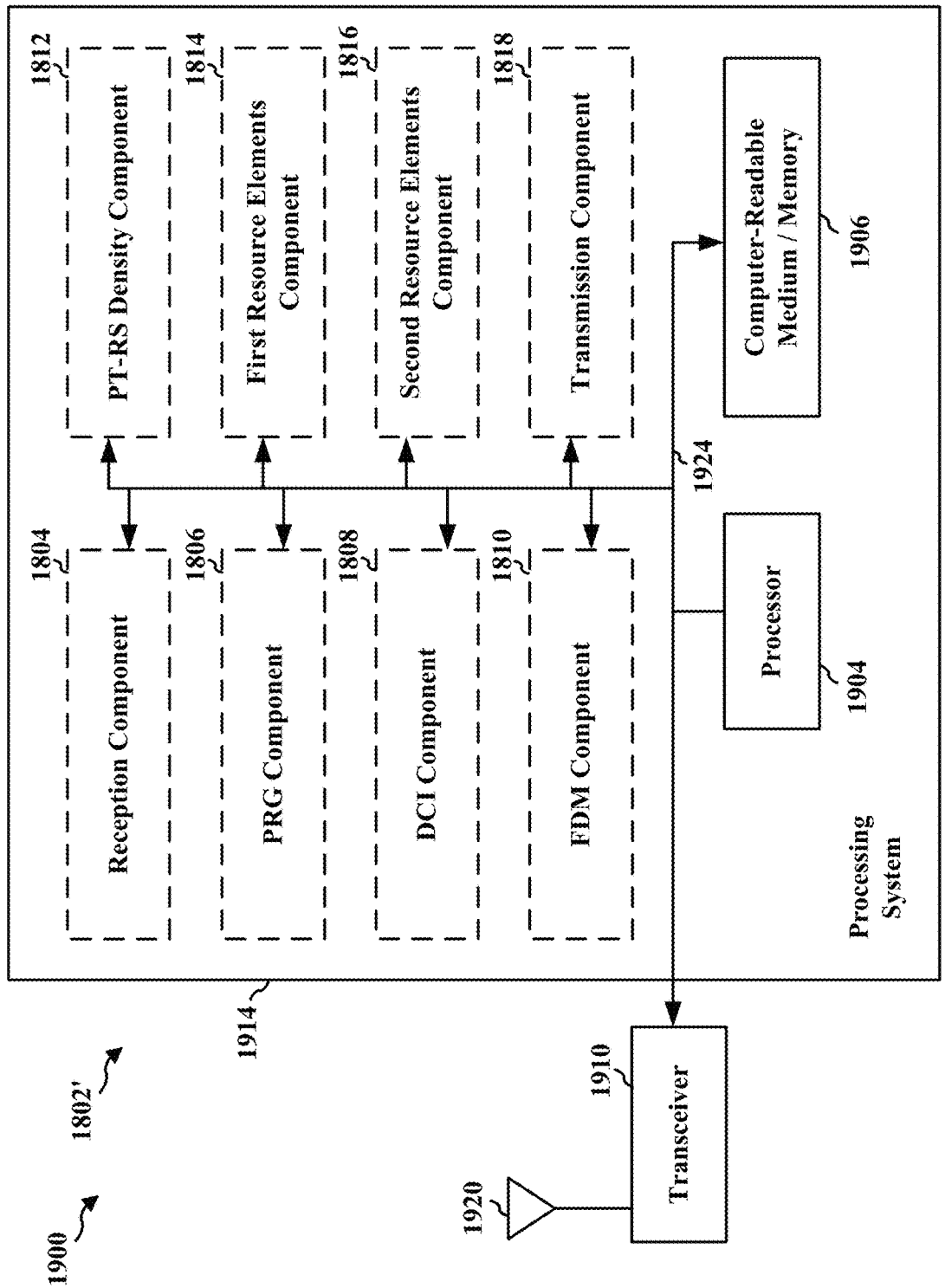
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, 1818, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1818, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, 1814, 1816, 1818. The components may be software components running in the processor 1904, resident/stored in the computer readable medium/memory 1906, one or more hardware components coupled to the processor 1904, or some combination thereof. The processing system 1914 may be a component of the UE 350 and may include the memory 360 and/or at least one of the TX processor 368, the RX processor 356, and the controller/processor 359. Alternatively, the processing system 1914 may be the entire UE (e.g., see 350 of FIG. 3).

In one configuration, the apparatus 1802/1802' for wireless communication includes means for receiving a configuration for a PRG of two RBs. The apparatus includes means for receiving DCI indicating two TCI states for a PDSCH. The apparatus includes means for determining FDM is to be used for the PDSCH and a PT-RS present in the PDSCH. The apparatus includes means for determining a PT-RS density in a frequency domain based on the PRG of two RBs, the two TCI states, and determining that FDM is to be used for the PDSCH. The apparatus further includes means for determining first resource elements for the PT-RS based on a first set of RBs for a first TCI state. The apparatus further includes means for determining second resource elements for the PT-RS based on a second set of RBs for a second TCI state. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 20:
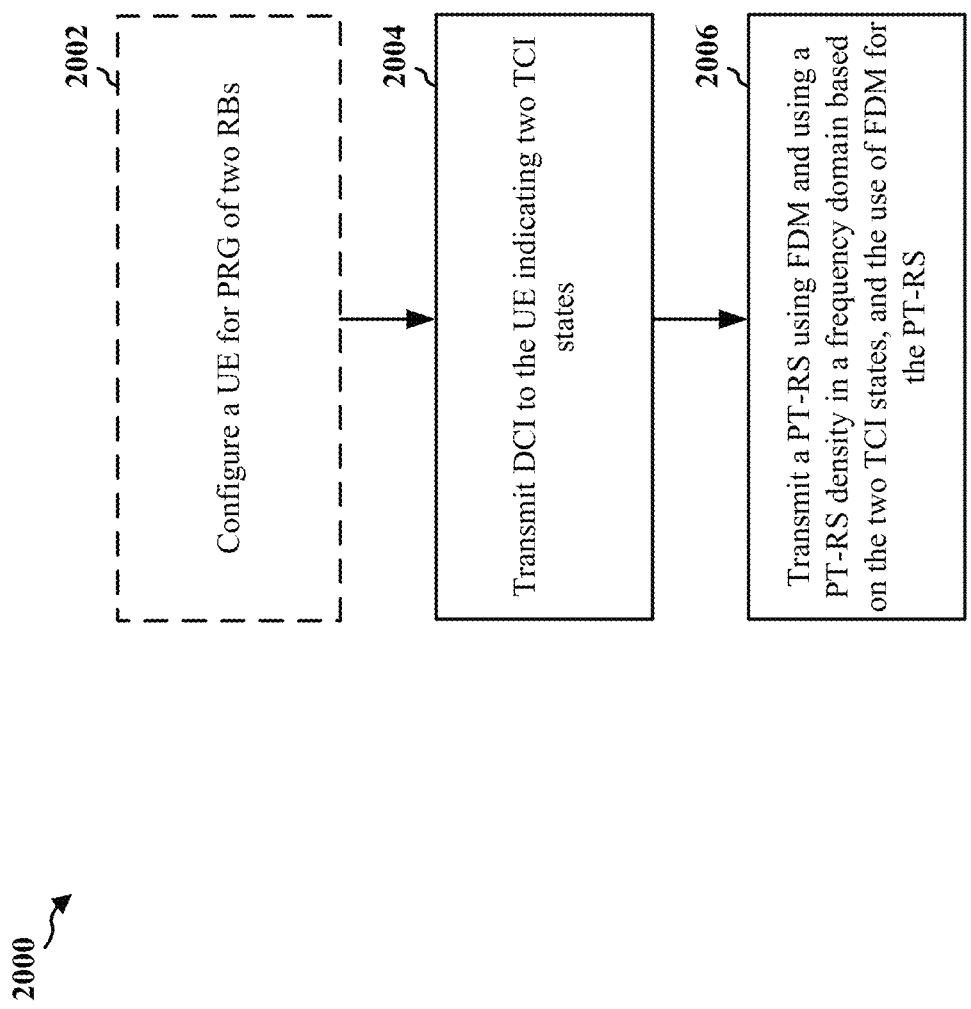
FIG. 20 is a flowchart of a method of wireless communication.

FIG. 20 is a flowchart of a method 2000 of wireless communication. The method may be performed by a base station or a component of a base station (e.g., the base station 102, 180, 310, 702, 704, 804, 904, 1004, 1250, 1850, 2450; the apparatus 2102/2102'; the processing system 2214, which may include the memory 376 and which may be the entire base station 310 or a component of the base station 310, such as the TX processor 316, the RX processor 370, and/or the controller/processor 375). According to various aspects, one or more of the illustrated operations of the method 2000 may be omitted, transposed, and/or contemporaneously performed. The method may enable a base station to configure a PT-RS for a UE.

At 2004, the base station may transmit DCI to the UE. For example, 2004 may be performed by DCI component 2108 of apparatus 2102. The DCI, sent by the base station, may indicate two TCI states for a PDSCH.

At 2006, the base station may transmit a PT-RS using FDM and using a PT-RS density in a frequency domain. For example, 2006 may be performed by PT-RS component 2110 of apparatus 2102. The base station may transmit the PT-RS using FDM and the PT-RS density in the frequency domain that is based on the two TCI states, and the use of FDM for the PDSCH. In some aspects, at 2002, the base station may configure a UE for a PRG. For example, 2002 may be performed by configuration component 2106 of apparatus 2102. The base station may configure the UE for the PRG of two RBs. At 2006, the PT-RS may be further based on the PRG of the two RBs.

In some aspects, the base station may use a PRG other than two RBs when a number of scheduled RBs corresponds to the PT-RS density in frequency of four. In some aspects, the base station may configure a number of scheduled RBs to be less than a threshold that corresponds to the PT-RS density in frequency of four. In some aspects, the base station may transmit the PT-RS using the PT-RS density in the frequency domain of two when a number of scheduled RBs is greater than a first threshold number of RBs and when the number of scheduled RBs is greater than a second threshold number of RBs. In some aspects, the base station may transmit the PT-RS using first resource elements for the PT-RS based on a first set of RBs for a first TCI state and using second resource elements for the PT-RS based on a second set of RBs for a second TCI state. In some aspects, the first resource elements and the second resource elements may be based on a RB offset that is based on a total number of allocated RBs for the first set of RBs and the second set of RBs. In some aspects, the first resource elements may be based on a first RB offset that is based on a first number of allocated RBs for the first set of RBs and the second resource elements may be based on a second RB offset that is based on a second number of allocated RBs for the second set of RBs. In some aspects, the first resource elements and the second resource elements may be based on a common resource element offset. In some aspects, the first resource elements may be based on a first configured resource element offset and the second resource elements may be based on a second configured resource element offset. In some aspects, the first resource elements and the second resource elements may have the PT-RS density in the frequency domain that is based on a total number of allocated RBs for the first set of RBs and the second set of RBs. In some aspects, the first resource elements may have a first PT-RS density in the frequency domain that is based on a first number of allocated RBs for the first set of RBs and the second resource elements may have a second PT-RS density in the frequency domain that is based on a second number of allocated RBs for the second set of RBs. A common set of thresholds may be used to determine the first PT-RS density and the second PT-RS density. In some aspects, the first resource elements may have a first PT-RS density in the frequency domain that is based on a first number of allocated RBs for the first set of RBs and the second resource elements may have a second PT-RS density in the frequency domain that is based on a second number of allocated RBs for the second set of RBs. A first set of thresholds may be used to determine the first PT-RS density and a second set of thresholds may be used to determine the second PT-RS density.

Figure 21:
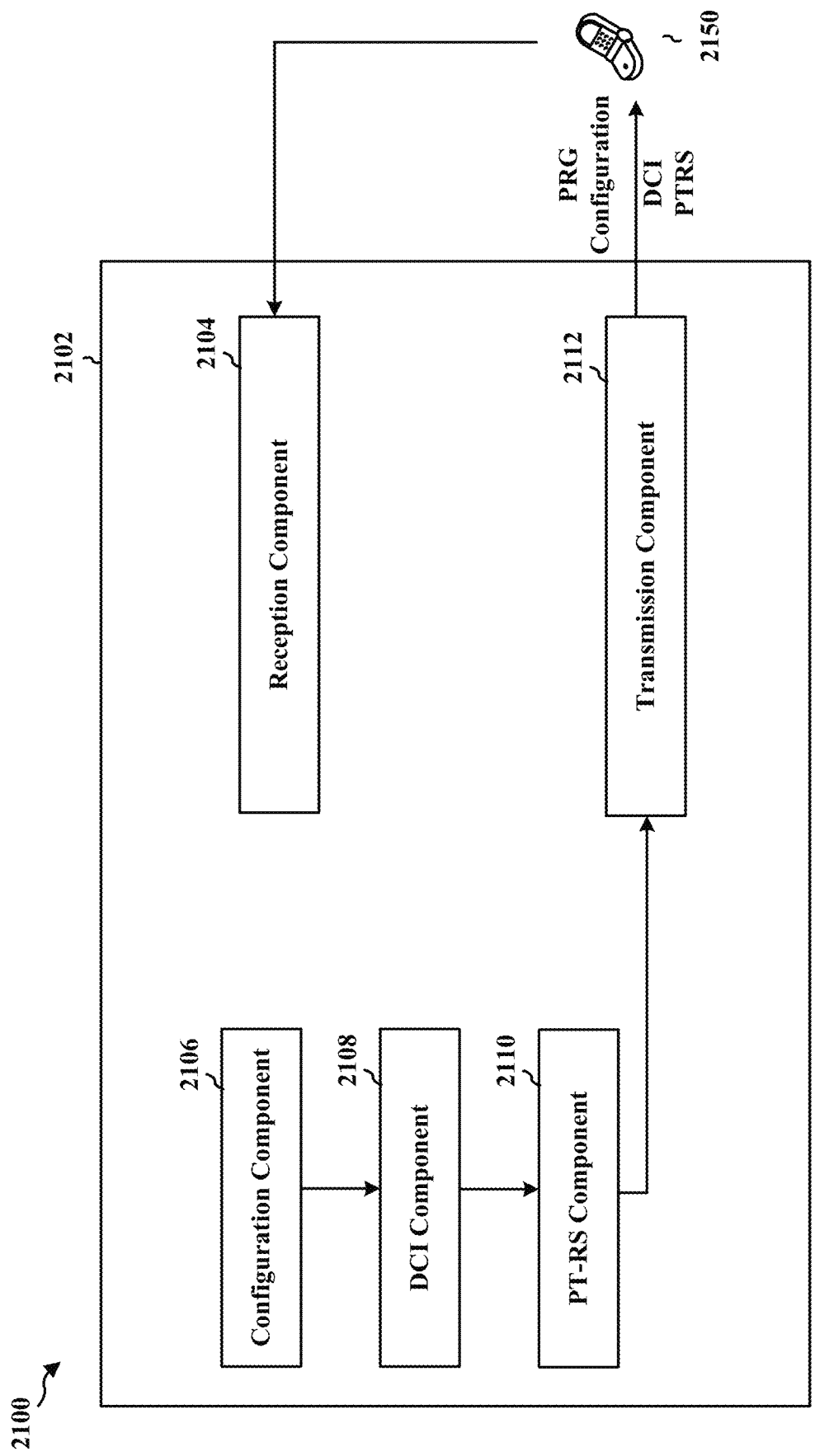
FIG. 21 is a conceptual data flow diagram illustrating the data flow between different means/components in an example apparatus.

FIG. 21 is a conceptual data flow diagram 2100 illustrating the data flow between different means/components in an example apparatus 2102. The apparatus may be a base station. The apparatus includes a reception component 2104 that may be configured to receive various types of signals/messages and/or other information from other devices, including, for example, the UE 2150. The apparatus includes a configuration component 2106 that may configure a UE for a PRG, e.g., as described in connection with 2002 of FIG. 20. The apparatus includes a DCI component 2108 that may transmit DCI to the UE, e.g., as described in connection with 2004 of FIG. 20. The apparatus includes a PT-RS component 2110 that may transmit a PT-RS using FDM and using a PT-RS density in a frequency domain, e.g., as described in connection with 2006 of FIG. 20. The apparatus includes a transmission component 2112 that may be configured to transmit various types of signals/messages and/or other information to other devices, including, for example, the UE 2150.

The apparatus may include additional components that perform each of the blocks of the algorithm in the aforementioned flowchart of FIG. 20. As such, each block in the aforementioned flowchart of FIG. 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 22:
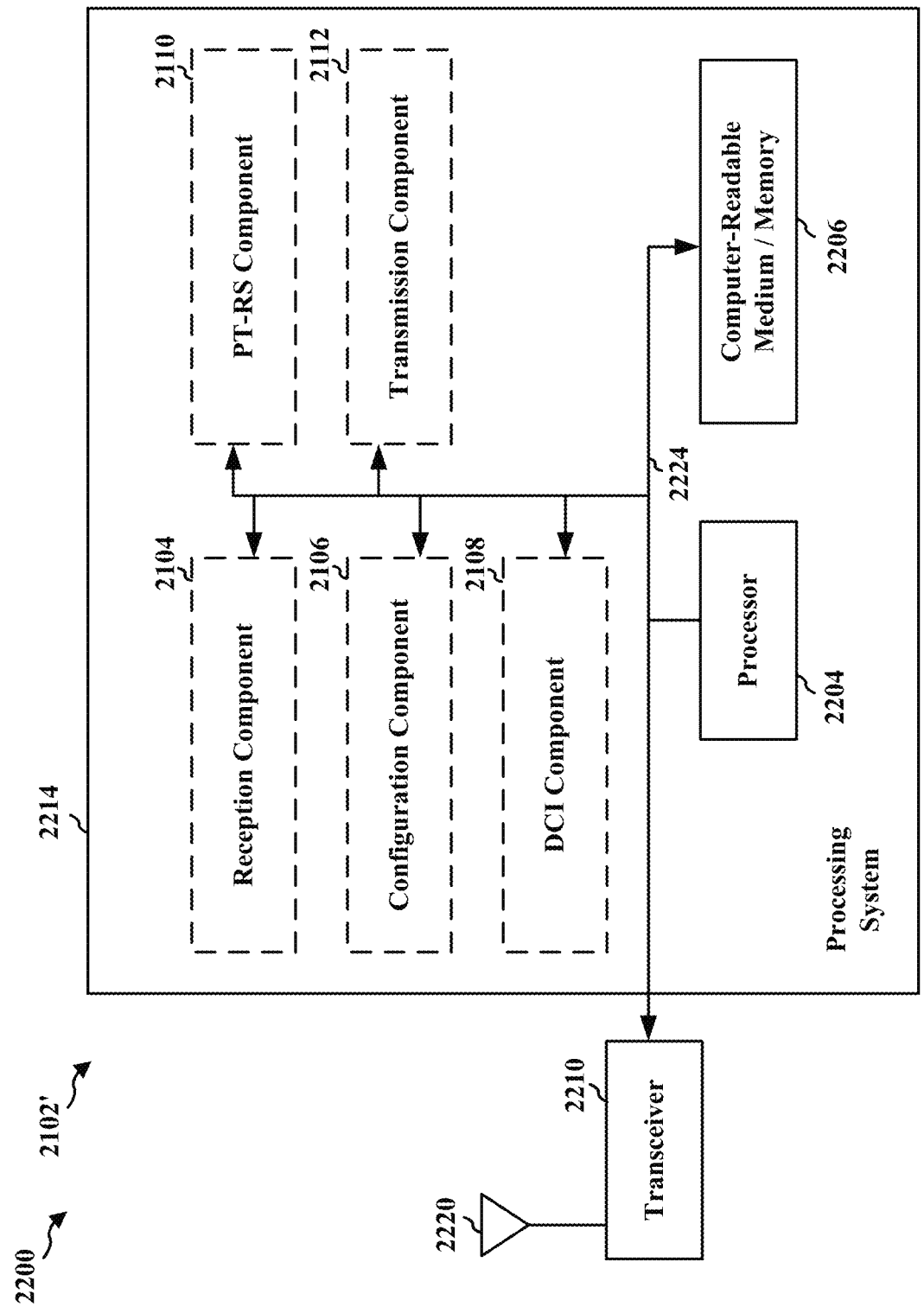
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware components, represented by the processor 2204, the components 2104, 2106, 2108, 2110, 2112, and the computer-readable medium/memory 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214, specifically the reception component 2104. In addition, the transceiver 2210 receives information from the processing system 2214, specifically the transmission component 2112, and based on the received information, generates a signal to be applied to the one or more antennas 2220. The processing system 2214 includes a processor 2204 coupled to a computer-readable medium/memory 2206. The processor 2204 is responsible for general processing, including the execution of software stored on the computer-readable medium/memory 2206. The software, when executed by the processor 2204, causes the processing system 2214 to perform the various functions described supra for any particular apparatus. The computer-readable medium/memory 2206 may also be used for storing data that is manipulated by the processor 2204 when executing software. The processing system 2214 further includes at least one of the components 2104, 2106, 2108, 2110, 2112. The components may be software components running in the processor 2204, resident/stored in the computer readable medium/memory 2206, one or more hardware components coupled to the processor 2204, or some combination thereof. The processing system 2214 may be a component of the base station 310 and may include the memory 376 and/or at least one of the TX processor 316, the RX processor 370, and the controller/processor 375. Alternatively, the processing system 2214 may be the entire base station (e.g., see 310 of FIG. 3).

In one configuration, the apparatus 2102/2102' for wireless communication includes means for configuring a UE for a PRG of two RBs. The apparatus includes means for transmitting DCI to the UE indicating two TCI states for a PDSCH. The apparatus includes means for transmitting a PT-RS using FDM and using a PT-RS density in a frequency domain that is based on the PRG of two RBs, the two TCI states, and the use of FDM for the PDSCH. The aforementioned means may be one or more of the aforementioned components of the apparatus 2102 and/or the processing system 2214 of the apparatus 2102' configured to perform the functions recited by the aforementioned means. As described supra, the processing system 2214 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 23:
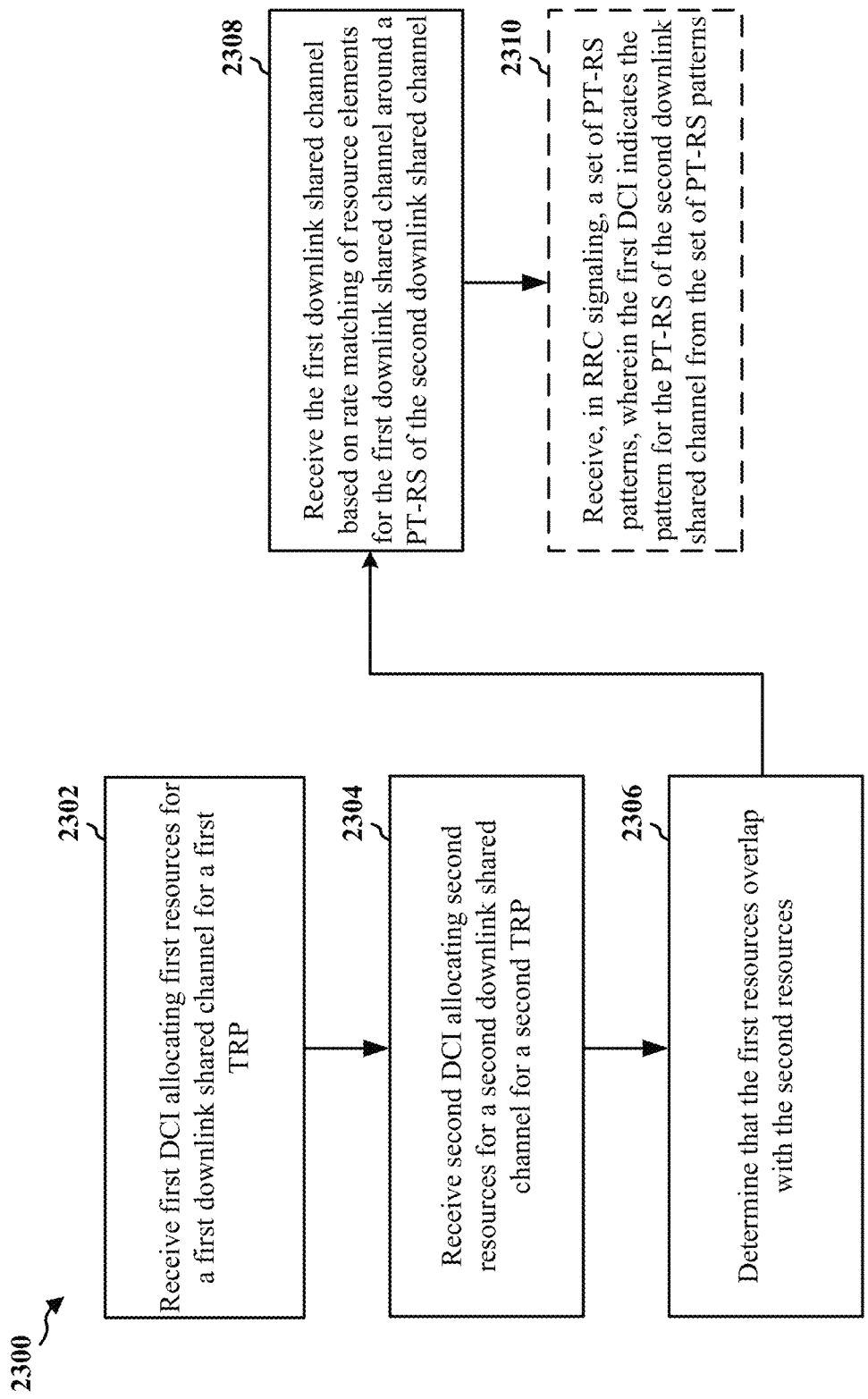
FIG. 23 is a flowchart of a method of wireless communication.

FIG. 23 is a flowchart of a method 2300 of wireless communication. The method may be performed by a UE or a component of a UE (e.g., the UE 104, 350, 406, 706, 802, 902, 1002, 1550, 2150, 2750; the apparatus 2402/2402'; the processing system 2514, which may include the memory 360 and which may be the entire UE 350 or a component of the UE 350, such as the TX processor 368, the RX processor 356, and/or the controller/processor 359. According to various aspects, one or more of the illustrated operations of the method 2300 may be omitted, transposed, and/or contemporaneously performed. Optional aspects are illustrated with a dashed line. The method may enable a UE to account for a PT-RS of a second downlink shared channel during the reception of a first downlink shared channel.

At 2302, the UE may receive a first DCI. For example, 2302 may be performed by first DCI component 2406 of apparatus 2402. The first DCI may allocate first resources for a first downlink shared channel for a first TRP. In some aspects, the UE may determine the first resources for the first downlink shared channel from the first DCI. In some aspects, the first DCI may be received in a first CORESET configured with a first value of a higher layer index.

At 2304, the UE may receive a second DCI. For example, 2304 may be performed by second DCI component 2408 of apparatus 2402. The second DCI may allocate second resources for a second downlink shared channel for a second TRP. In some aspects, the UE may determine the second resources for the second downlink shared channel including PT-RS resource elements from the second DCI. In some aspects, the UE may determine PT-RS resource elements for the second downlink shared channel from the first DCI. In some aspects, the first DCI may indicate a presence of the PT-RS of the second downlink shared channel. In some aspects, the first DCI may indicate a pattern of the PT-RS of the second downlink shared channel. In some aspects, the second DCI may be received in a second CORESET configured with a second value of a higher layer index.

At 2306, the UE may determine that the first resources overlap with the second resources. For example, 2306 may be performed by overlap component 2410 of apparatus 2402. In some aspects, the UE may determine that the first resources overlap with the second resources based on the first resources allocated for the first downlink shared channel in the first DCI and the second resources allocated for the second downlink shared channel in the second DCI.

At 2308, the UE may receive the first downlink shared channel. For example, 2308 may be performed by shared channel component 2412 of apparatus 2402. In some aspects, the UE may receive the first downlink shared channel based on rate matching of resource elements for the first downlink shared channel around a PT-RS of the second downlink shared channel.

In some aspects, for example at 2310, the UE may receive a set of PT-RS patterns. For example, 2310 may be performed by PT-RS patterns component 2414 of apparatus 2402. In some aspects, the first DCI may indicate the pattern for the PT-RS of the second downlink shared channel from the set of PT-RS patterns. The UE may receive the set of PT-RS patterns in RRC signaling.

Figure 24:
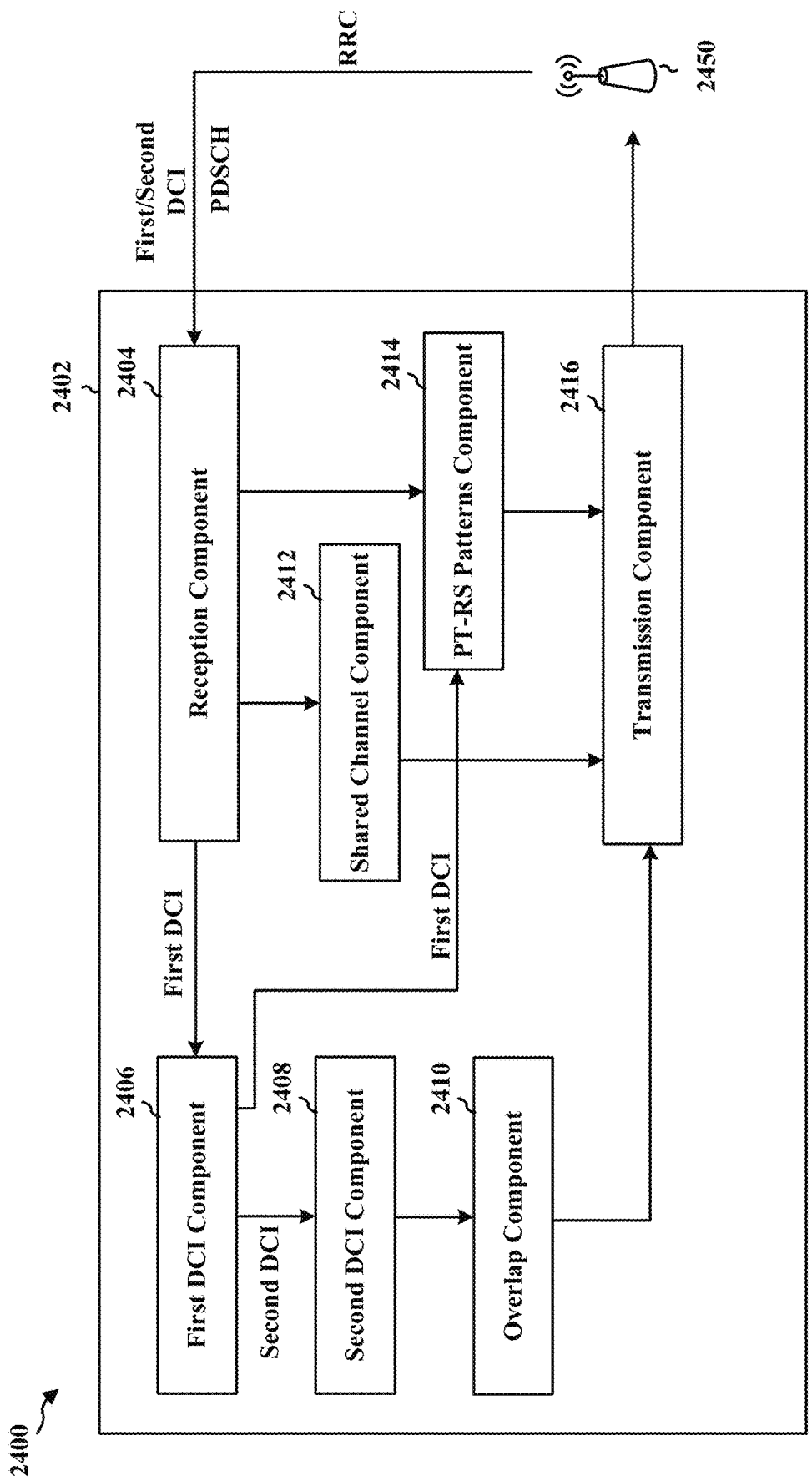
FIG. 24 is a conceptual data flow diagram illustrating the data flow between different means/components in an example apparatus.

FIG. 24 is a conceptual data flow diagram 2400 illustrating the data flow between different means/components in an example apparatus 2402. The apparatus may be a UE. The apparatus includes a reception component 2404 that may be configured to receive various types of signals/messages and/or other information from other devices, including, for example, the base station 2450. The apparatus includes a first DCI component 2406 that may receive a first DCI, e.g., as described in connection with 2302 of FIG. 23. The apparatus includes a second DCI component 2408 that may receive a second DCI, e.g., as described in connection with 2304 of FIG. 23. The apparatus includes an overlap component 2410 that may determine that the first resources overlap with the second resources, e.g., as described in connection with 2306 of FIG. 23. The apparatus includes a shared channel component 2412 that may receive the first downlink shared channel, e.g., as described in connection with 2308 of FIG. 23. The apparatus includes a PT-RS patterns component 2414 that may receive a set of PT-RS patterns, e.g., as described in connection with 2310 of FIG. 23. The apparatus includes a transmission component 2416 that may be configured to transmit various types of signals/messages and/or other information to other devices, including, for example, the base station 2450.

The apparatus may include additional components that perform each of the blocks of the algorithm in the aforementioned flowchart of FIG. 23. As such, each block in the aforementioned flowchart of FIG. 23 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 25:
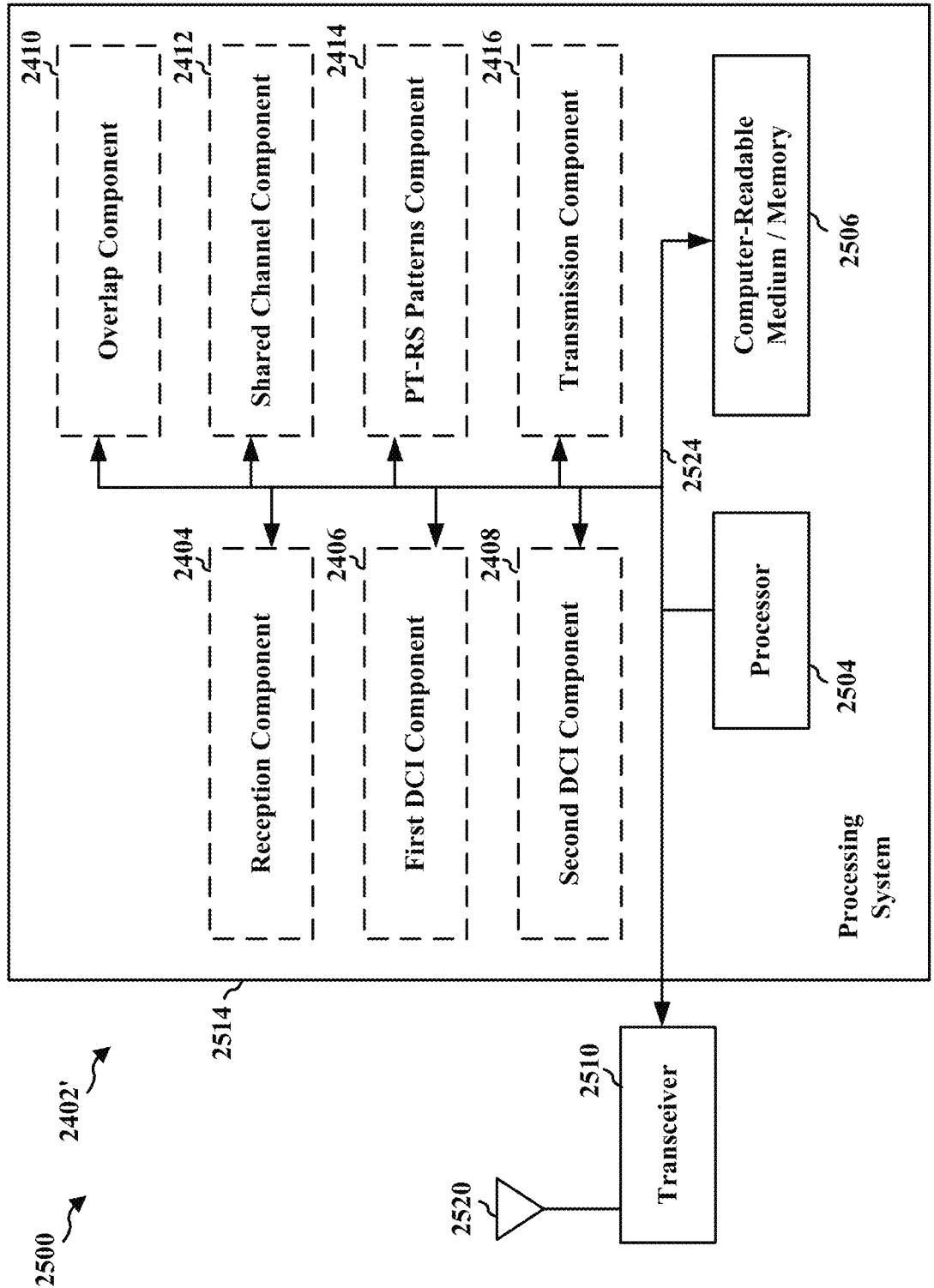
FIG. 25 is a diagram illustrating an example of a hardware implementation for an apparatus employing a processing system.

FIG. 25 is a diagram 2500 illustrating an example of a hardware implementation for an apparatus 2402' employing a processing system 2514. The processing system 2514 may be implemented with a bus architecture, represented generally by the bus 2524. The bus 2524 may include any number of interconnecting buses and bridges depending on the specific application of the processing system 2514 and the overall design constraints. The bus 2524 links together various circuits including one or more processors and/or hardware components, represented by the processor 2504, the components 2404, 2406, 2408, 2410, 2412, 2414, 2416, and the computer-readable medium/memory 2506. The bus 2524 may also link various other circuits such as timing sources, peripherals, voltage regulators, and power management circuits, which are well known in the art, and therefore, will not be described any further.

The processing system 2514 may be coupled to a transceiver 2510. The transceiver 2510 is coupled to one or more antennas 2520. The transceiver 2510 provides a means for communicating with various other apparatus over a transmission medium. The transceiver 2510 receives a signal from the one or more antennas 2520, extracts information from the received signal, and provides the extracted information to the processing system 2514, specifically the reception component 2404. In addition, the transceiver 2510 receives information from the processing system 2514, specifically the transmission component 2416, and based on the received information, generates a signal to be applied to the one or more antennas 2520. The processing system 2514 includes a processor 2504 coupled to a computer-readable medium/memory 2506. The processor 2504 is responsible for general processing, including the execution of software stored on the computer-readable medium/memory 2506. The software, when executed by the processor 2504, causes the processing system 2514 to perform the various functions described supra for any particular apparatus. The computer-readable medium/memory 2506 may also be used for storing data that is manipulated by the processor 2504 when executing software. The processing system 2514 further includes at least one of the components 2404, 2406, 2408, 2410, 2412, 2414, 2416. The components may be software components running in the processor 2504, resident/stored in the computer readable medium/memory 2506, one or more hardware components coupled to the processor 2504, or some combination thereof. The processing system 2514 may be a component of the UE 350 and may include the memory 360 and/or at least one of the TX processor 368, the RX processor 356, and the controller/processor 359. Alternatively, the processing system 2514 may be the entire UE (e.g., see 350 of FIG. 3).

In one configuration, the apparatus 2402/2402' for wireless communication includes means for receiving first DCI allocating first resources for a first downlink shared channel for a first TRP. The apparatus includes means for receiving second DCI allocating second resources for a second downlink shared channel for a second TRP. The apparatus includes means for determining that the first resources overlap with the second resources. The apparatus includes means for receiving the first downlink shared channel based on rate matching of resource elements for the first downlink shared channel around a PT-RS of the second downlink shared channel. The apparatus further includes means for receiving, in RRC signaling, a set of PT-RS patterns. The first DCI indicates the pattern for the PT-RS of the second downlink shared channel from the set of PT-RS patterns. The aforementioned means may be one or more of the aforementioned components of the apparatus 2402 and/or the processing system 2514 of the apparatus 2402' configured to perform the functions recited by the aforementioned means. As described supra, the processing system 2514 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 26:
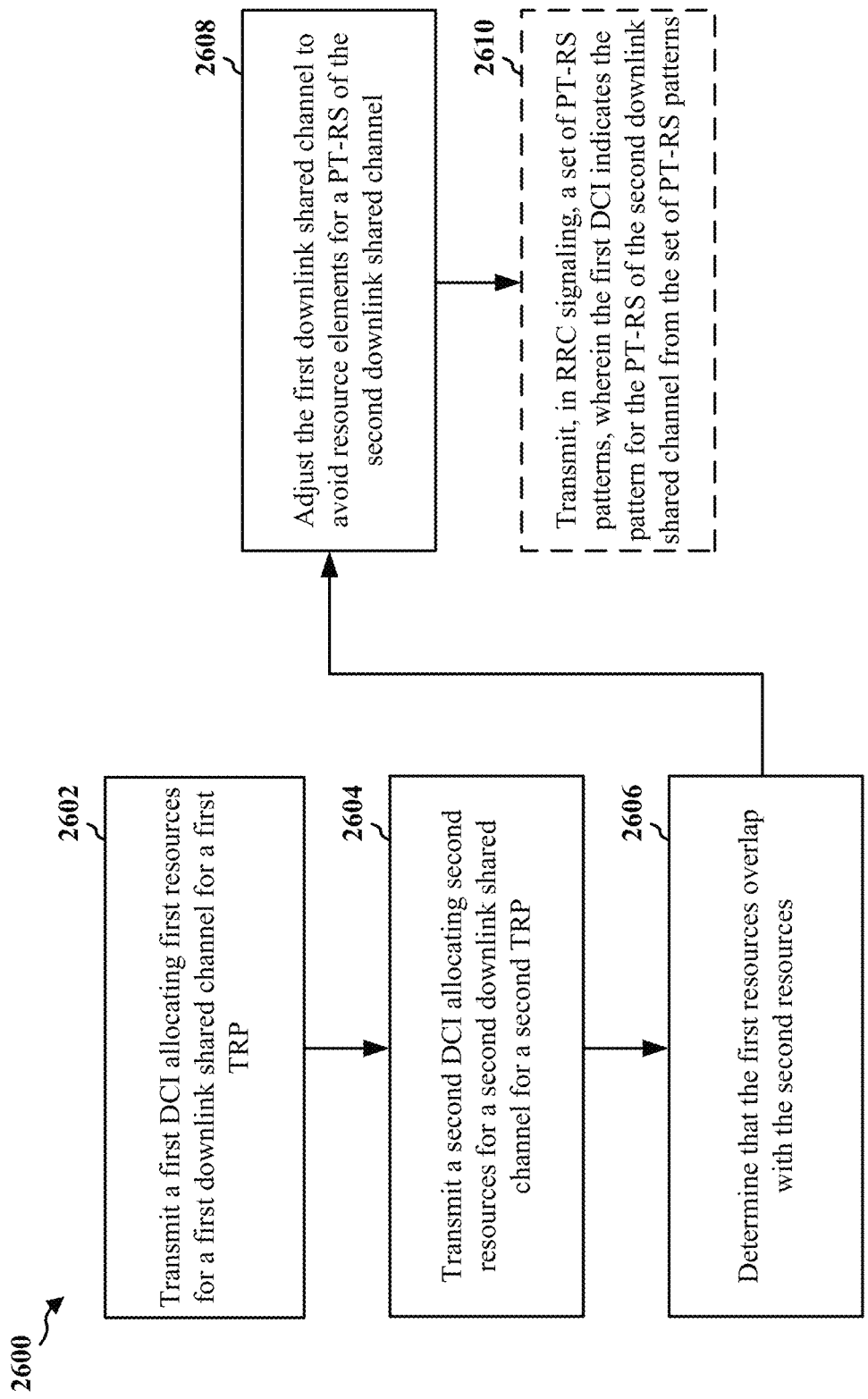
FIG. 26 is a flowchart of a method of wireless communication.

FIG. 26 is a flowchart of a method 2600 of wireless communication. The method may be performed by a base station or a component of a base station (e.g., the base station 102, 180, 310, 702, 704, 804, 904, 1004, 1250, 1850, 2450; the apparatus 2702/2702'; the processing system 2814, which may include the memory 376 and which may be the entire base station 310 or a component of the base station 310, such as the TX processor 316, the RX processor 370, and/or the controller/processor 375). According to various aspects, one or more of the illustrated operations of the method 2600 may be omitted, transposed, and/or contemporaneously performed. The method may enable a base station to account for a PT-RS of a second downlink shared channel during the reception of a first downlink shared channel.

At 2602, the base station may transmit a first DCI. For example, 2602 may be performed by first DCI component 2706 of apparatus 2702. The first DCI may allocate first resources for a first downlink shared channel for a first TRP. In some aspects, the first DCI may be transmitted in a first CORESET configured with a first value of a higher layer index.

At 2604, the base station may transmit a second DCI. For example, 2604 may be performed by second DCI component 2708 of apparatus 2702. The second DCI may allocate second resources for a second downlink shared channel for a second TRP. In some aspects, the second DCI may be transmitted in a second CORESET configured with a second value of a higher layer index.

At 2606, the base station may determine that the first resources overlap with the second resources. For example, 2606 may be performed by overlap component 2710 of apparatus 2702. In some aspects, the base station may determine that the first resources overlap with the second resources based on the first resources allocated for the first downlink shared channel in the first DCI and the second resources allocated for the second downlink shared channel in the second DCI.

At 2608, the base station may adjust the first downlink shared channel. For example, 2608 may be performed by adjust component 2712 of apparatus 2702. The base station may adjust the first downlink shared channel to avoid resource elements for a PT-RS of the second downlink shared channel. In some aspects, adjusting the first downlink shared channel may include puncturing the first resources of the first downlink shared channel to avoid the resource elements for the PT-RS of the second downlink shared channel. In some aspects, adjusting the first downlink shared channel may include rate matching the first downlink shared channel around the resource elements for the PT-RS of the second downlink shared channel. In some aspects, the first resources for the first downlink shared channel may be indicated in the first DCI and the second resources for the second downlink shared channel including the resource elements for the PT-RS may be indicated in the second DCI. In some aspects, the resource elements for the PT-RS of the second downlink shared channel may be indicated in the first DCI. In some aspects, the first DCI may indicate a presence of the PT-RS of the second downlink shared channel. In some aspects, the first DCI may indicate a pattern of the PT-RS of the second downlink shared channel.

In some aspects, for example at 2610, the base station may transmit a set of PT-RS patterns. For example, 2610 may be performed by PT-RS patterns component 2714 of apparatus 2702. In some aspects, the first DCI may indicate the pattern for the PT-RS of the second downlink shared channel from the set of PT-RS patterns. The base station may transmit the set of PT-RS patterns in RRC signaling.

Figure 27:
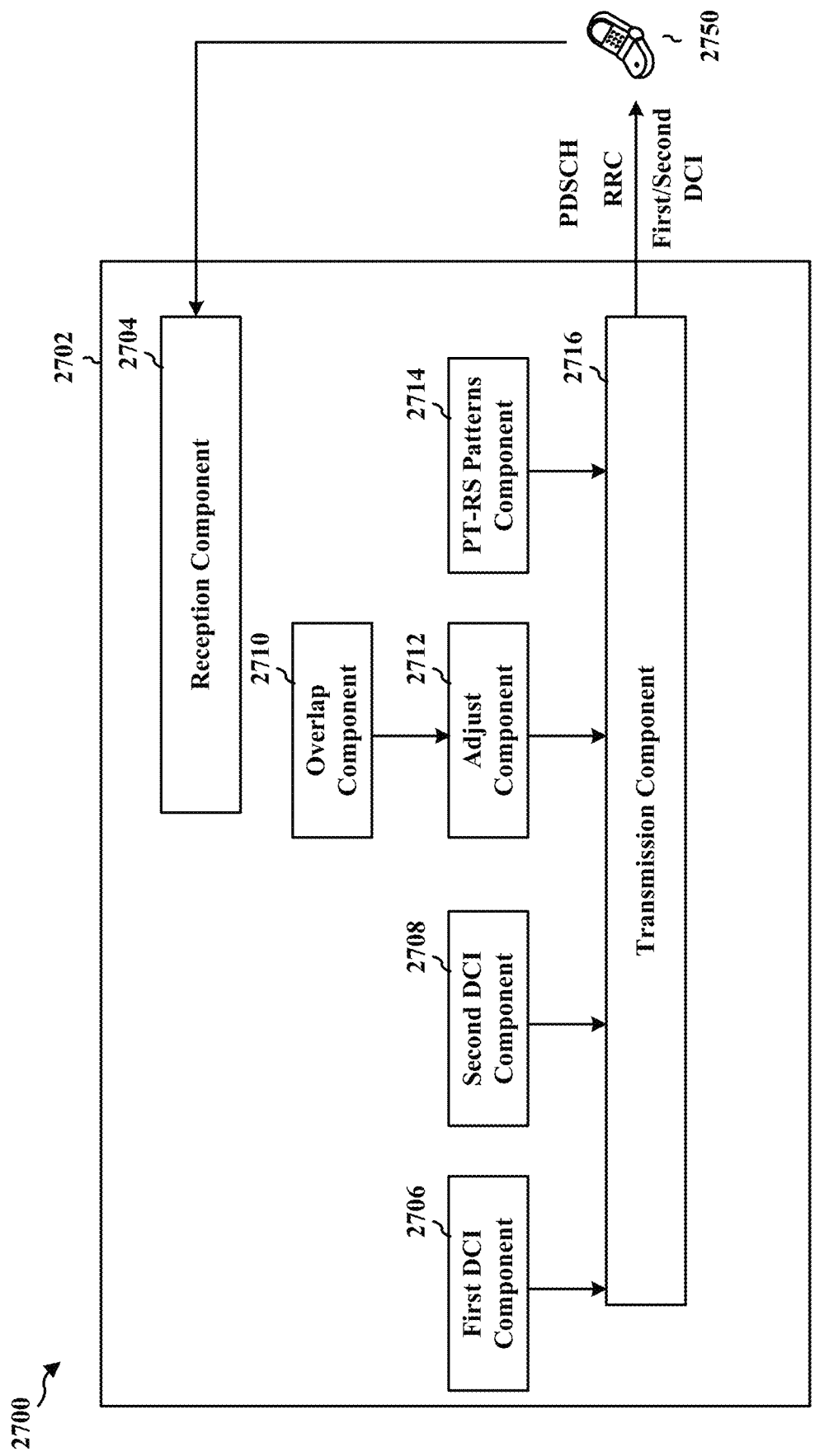
FIG. 27 is a conceptual data flow diagram illustrating the data flow between different means/components in an example apparatus.

FIG. 27 is a conceptual data flow diagram 2700 illustrating the data flow between different means/components in an example apparatus 2702. The apparatus may be a base station. The apparatus includes a reception component 2704 that may be configured to receive various types of signals/messages and/or other information from other devices, including, for example, the UE 2750. The apparatus includes a first DCI component 2706 that may transmit a first DCI, e.g., as described in connection with 2602 of FIG. 26. The apparatus includes a second DCI component 2708 that may transmit a second DCI, e.g., as described in connection with 2604 of FIG. 26. The apparatus includes an overlap component 2710 that may determine that the first resources overlap with the second resources, e.g., as described in connection with 2606 of FIG. 26. The apparatus includes an adjust component 2712 that may adjust the first downlink shared channel, e.g., as described in connection with 2608 of FIG. 26. The apparatus includes a PT-RS patterns component 2714 that may transmit a set of PT-RS patterns, e.g., as described in connection with 2610 of FIG. 26. The apparatus includes a transmission component 2716 that may be configured to transmit various types of signals/messages and/or other information to other devices, including, for example, the UE 2750.

The apparatus may include additional components that perform each of the blocks of the algorithm in the aforementioned flowchart of FIG. 26. As such, each block in the aforementioned flowchart of FIG. 26 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 28:
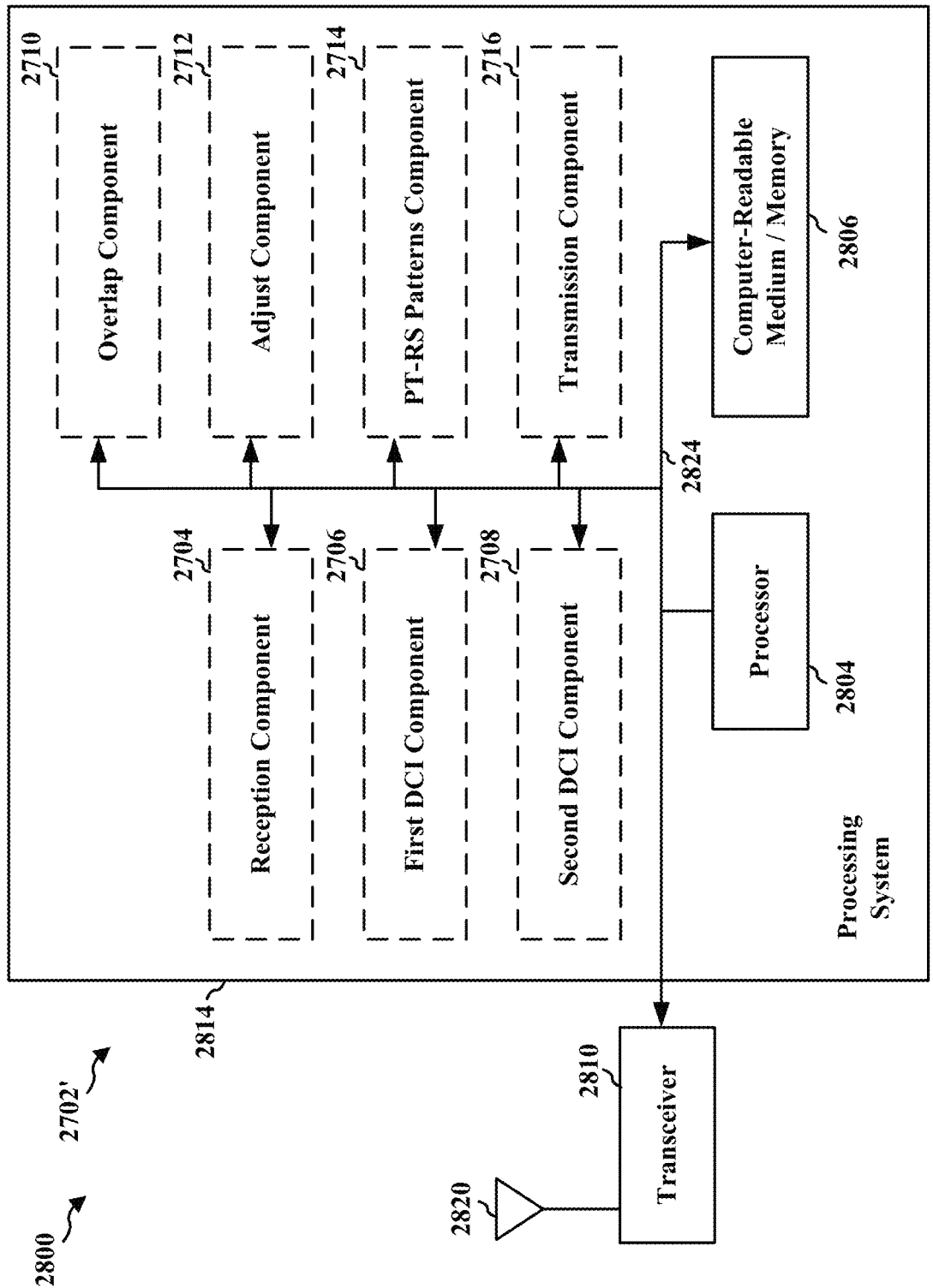
FIG. 28 is a diagram illustrating an example of a hardware implementation for an apparatus employing a processing system.

FIG. 28 is a diagram 2800 illustrating an example of a hardware implementation for an apparatus 2702' employing a processing system 2814. The processing system 2814 may be implemented with a bus architecture, represented generally by the bus 2824. The bus 2824 may include any number of interconnecting buses and bridges depending on the specific application of the processing system 2814 and the overall design constraints. The bus 2824 links together various circuits including one or more processors and/or hardware components, represented by the processor 2804, the components 2704, 2706, 2708, 2710, 2712, 2714, 2716, and the computer-readable medium/memory 2806. The bus 2824 may also link various other circuits such as timing sources, peripherals, voltage regulators, and power management circuits, which are well known in the art, and therefore, will not be described any further.

The processing system 2814 may be coupled to a transceiver 2810. The transceiver 2810 is coupled to one or more antennas 2820. The transceiver 2810 provides a means for communicating with various other apparatus over a transmission medium. The transceiver 2810 receives a signal from the one or more antennas 2820, extracts information from the received signal, and provides the extracted information to the processing system 2814, specifically the reception component 2704. In addition, the transceiver 2810 receives information from the processing system 2814, specifically the transmission component 2716, and based on the received information, generates a signal to be applied to the one or more antennas 2820. The processing system 2814 includes a processor 2804 coupled to a computer-readable medium/memory 2806. The processor 2804 is responsible for general processing, including the execution of software stored on the computer-readable medium/memory 2806. The software, when executed by the processor 2804, causes the processing system 2814 to perform the various functions described supra for any particular apparatus. The computer-readable medium/memory 2806 may also be used for storing data that is manipulated by the processor 2804 when executing software. The processing system 2814 further includes at least one of the components 2704, 2706, 2708, 2710, 2712, 2714, 2716. The components may be software components running in the processor 2804, resident/stored in the computer readable medium/memory 2806, one or more hardware components coupled to the processor 2804, or some combination thereof. The processing system 2814 may be a component of the base station 310 and may include the memory 376 and/or at least one of the TX processor 316, the RX processor 370, and the controller/processor 375. Alternatively, the processing system 2814 may be the entire base station (e.g., see 310 of FIG. 3).

In one configuration, the apparatus 2702/2702' for wireless communication includes means for transmitting a first DCI allocating first resources for a first downlink shared channel for a first TRP. The apparatus includes means for transmitting a second DCI allocating second resources for a second downlink shared channel for a second TRP. The apparatus includes means for determining that the first resources overlap with the second resources. The apparatus includes means for adjusting the first downlink shared channel to avoid resource elements for a PT-RS of the second downlink shared channel. The apparatus further includes means for transmitting, in RRC signaling, a set of PT-RS patterns. The first DCI indicates the pattern for the PT-RS of the second downlink shared channel from the set of PT-RS patterns. The aforementioned means may be one or more of the aforementioned components of the apparatus 2702 and/or the processing system 2814 of the apparatus 2702' configured to perform the functions recited by the aforementioned means. As described supra, the processing system 2814 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:

transmitting a capability indication for more than one phase tracking reference signal (PT-RS) port for receiving a downlink shared channel based on a first transmission configuration indication (TCI) state and a second TCI state;

receiving a configuration for a maximum number of downlink PT-RS ports from a base station;

determining a number of downlink PT-RS ports based on a plurality of TCI states indicated in downlink control information (DCI) from the base station, wherein the number of downlink PT-RS ports is determined to be more than one when a number of the plurality of TCI states is more than one and a number of demodulation reference signal (DMRS) code division multiplexing (CDM) groups is more than one;

determining a first PT-RS port based on a first, lowest indexed demodulation reference signal (DMRS) port corresponding to the first TCI state; and determining a second PT-RS port based on a second, lowest indexed DMRS port corresponding to the second TCI state.

2. The method of claim 1, further comprising:

determining the number of downlink PT-RS ports based on at least one of the configuration for the maximum number of downlink PT-RS ports or the number of DMRS CDM groups indicated in the DCI from the base station.

3. The method of claim 2, wherein the UE determines the number of downlink PT-RS ports to be one when the maximum number of downlink PT-RS ports is one.

4. The method of claim 2, wherein the UE determines the number of downlink PT-RS ports based on at least one of the plurality of TCI states or the number of DMRS CDM groups when the maximum number of downlink PT-RS ports is more than one.

5. The method of claim 4, wherein the UE determines the number of downlink PT-RS ports is one when the number of DMRS CDM groups is one.

6. The method of claim 1, further comprising:

determining the first TCI state and the second TCI state from a TCI field in downlink control information (DCI) received from the base station.

7. The method of claim 1, wherein the first PT-RS port is determined based on the first, lowest indexed DMRS port in a first indicated CDM group; and the second PT-RS port is determined based on the second, lowest indexed DMRS port in a second indicated CDM group.

8. The method of claim 7, further comprising:

determining the first indicated CDM group and the second indicated CDM group in downlink control information (DCI) received from the base station.

9. The method of claim 8, furthered comprising:

receiving the first PT-RS port and the second PT-RS port based on QCL properties of the corresponding DMRS port.

10. The method of claim 1, further comprising:

determining a PT-RS density based on the first TCI state and the second TCI state.

11. A method of wireless communication at a base station, comprising:

receiving a capability indication from a user equipment (UE) for more than one phase tracking reference signal (PT-RS) port for receiving a downlink shared channel based on a first transmission configuration indication (TCI) state and a second TCI state;

configuring the UE for a maximum number of downlink PT-RS ports; and transmitting PT-RS to the UE using a number of downlink PT-RS ports based on a plurality of TCI states indicated in downlink control information (DCI) from the base station, wherein the PT-RS is transmitted using more than one PT-RS port when a number of the plurality of TCI states is more than one and a number of demodulation reference signal (DMRS) code division multiplexing (CDM) groups is more than one, wherein the base station transmits the PT-RS using a first PT-RS port that corresponds to a first, lowest indexed demodulation reference signal (DMRS) port for the first TCI state and transmits the PT-RS using a second PT-RS port that corresponds to a second, lowest indexed DMRS port for the second TCI state.

12. The method of claim 11, wherein transmitting the PT-RS to the UE using the number of downlink PT-RS ports is based on at least the maximum number of downlink PT-RS ports or the number of DMRS CDM groups indicated in the DCI from the base station.

13. The method of claim 12, wherein the base station transmits the PT-RS using a single PT-RS port when the maximum number of downlink PT-RS ports is one.

14. The method of claim 12, wherein the base station transmits the PT-RS using the number of downlink PT-RS ports based on at least one of the plurality of TCI states or the number of DMRS CDM groups when the maximum number of downlink PT-RS ports is more than one.

15. The method of claim 14, wherein the base station transmits the PT-RS using a single PT-RS port when the number of DMRS CDM groups is one.

16. The method of claim 12, wherein the base station transmits the PT-RS using the first PT-RS port that corresponds to the first, lowest indexed DMRS port for a first indicated DMRS CDM group, and transmits the PT-RS using the second PT-RS port that corresponds to the second, lowest indexed DMRS port for a second indicated DMRS CDM group.

17. The method of claim 16, wherein the first indicated DMRS CDM group and the second indicated DMRS CDM group are indicated in the DCI from the base station, and wherein the first PT-RS port and the second PT-RS port are transmitted based on quasi co-location (QCL) properties of the corresponding DMRS port.

18. The method of claim 11, further comprising:
indicating the first TCI state and the second TCI state in a TCI field comprised in the DCI.

19. An apparatus for wireless communication at a user equipment (UE), comprising:
a memory; and
at least one processor coupled to the memory and configured to:
transmit a capability indication for more than one phase tracking reference signal (PT-RS) port for receiving a downlink shared channel based on a first transmission configuration indication (TCI) state and a second TCI state;
receive a configuration for a maximum number of downlink PT-RS ports from a base station;
determine a number of downlink PT-RS ports based on at least one of a plurality of TCI states indicated in downlink control information (DCI) from the base station, wherein the number of downlink PT-RS ports is determined to be more than one when a number of the plurality of TCI states is more than one and a number of demodulation reference signal (DMRS) code division multiplexing (CDM) groups is more than one;
determine a first PT-RS port based on a first, lowest indexed demodulation reference signal (DMRS) port corresponding to the first TCI state; and
determine a second PT-RS port based on a second, lowest indexed DMRS port corresponding to the second TCI state.

20. The apparatus of claim 19, wherein the at least one processor is further configured to:
determine the number of downlink PT-RS ports based on the configuration for the maximum number of downlink PT-RS ports or the number of DMRS CDM groups indicated in the DCI from the base station.

21. The apparatus of claim 20, wherein the at least one processor is configured to determine the number of downlink PT-RS ports to be one when the maximum number of downlink PT-RS ports is one, and is configured to determine the number of downlink PT-RS ports based on at least one of the plurality of TCI states or the number of DMRS CDM groups when the maximum number of downlink PT-RS ports is more than one.

22. The apparatus of claim 21, wherein the at least one processor is configured to determine the number of downlink PT-RS ports is one when the plurality of TCI states is one or the number of DMRS CDM groups is one, and is configured to determine the number of downlink PT-RS ports to be more than one when the plurality of TCI states is more than one and the number of DMRS CDM groups is more than one.

23. The apparatus of claim 19, wherein the at least one processor is further configured to:
determine a PT-RS density based on the first TCI state and the second TCI state.

24. An apparatus for wireless communication at a base station, comprising:
a memory; and
at least one processor coupled to the memory and configured to:
receive a capability indication from a user equipment (UE) for more than one phase tracking reference signal (PT-RS) port for receiving a downlink shared channel based, both, on a first transmission configuration indication (TCI) state and a second TCI state;
configure the UE for a maximum number of downlink PT-RS ports; and
transmit PT-RS to the UE using a number of downlink PT-RS ports based on a plurality of TCI states indicated in downlink control information (DCI) from the base station, wherein the PT-RS is transmitted using more than one PT-RS port when a number of the plurality of TCI states is more than one and a number of demodulation reference signal (DMRS) code division multiplexing (CDM) groups is more than one,
wherein the at least one processor is configured to transmit the PT-RS using a first PT-RS port that corresponds to a first, lowest indexed demodulation reference signal (DMRS) port for a first transmission configuration indication (TCI) state, and is configured to transmit the PT-RS using a second PT-RS port that corresponds to a second, lowest indexed DMRS port for the second TCI state.

25. The apparatus of claim 24, wherein the at least one processor is further configured to:

transmit the PT-RS to the UE using the number of downlink PT-RS ports based on at least one of the maximum number of downlink PT-RS ports or the number of DMRS CDM groups indicated in the DCI from the base station.

26. The apparatus of claim 25, wherein the at least one processor is configured to transmit the PT-RS using a single PT-RS port when the maximum number of downlink PT-RS ports is one, and is configured to transmit the PT-RS using the number of downlink PT-RS ports based on at least one of the plurality of TCI states or the number of DMRS CDM groups when the maximum number of downlink PT-RS ports is more than one.

* * * * *